June 30, 1942.  A. F. POTT  2,288,323
CALCULATING MACHINE
Original Filed Sept. 23, 1931   15 Sheets-Sheet 2

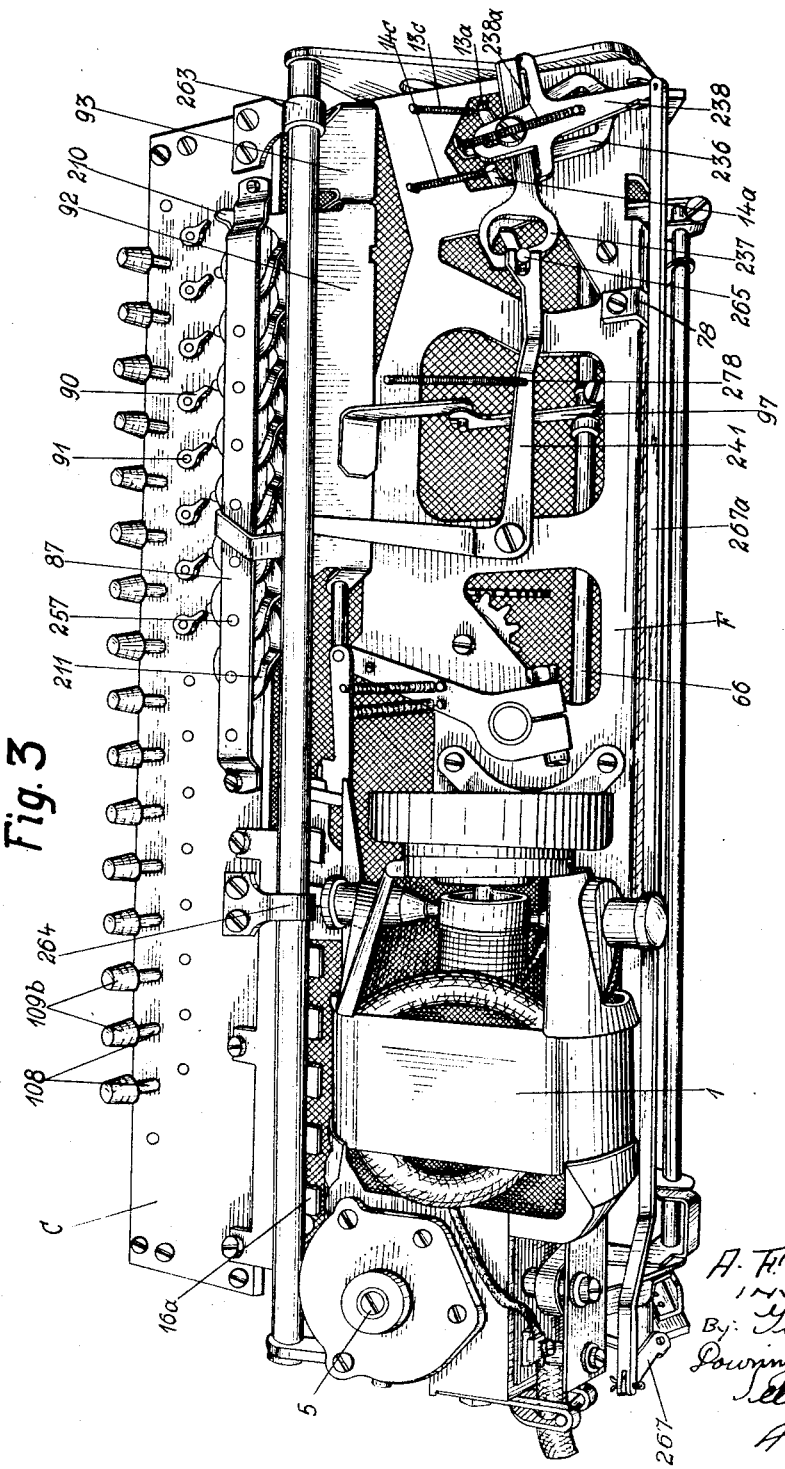

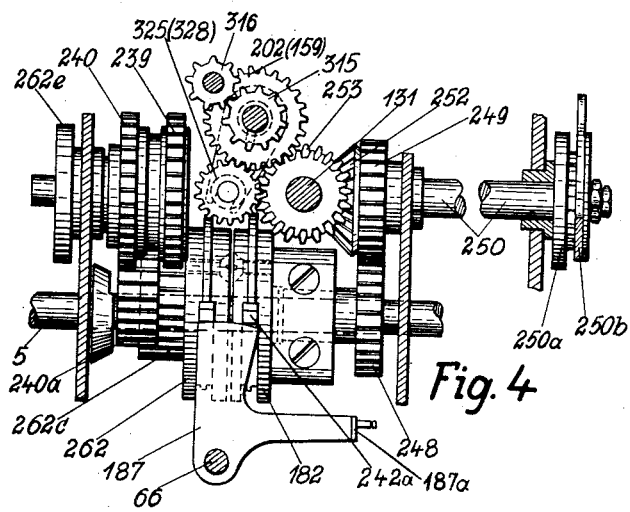
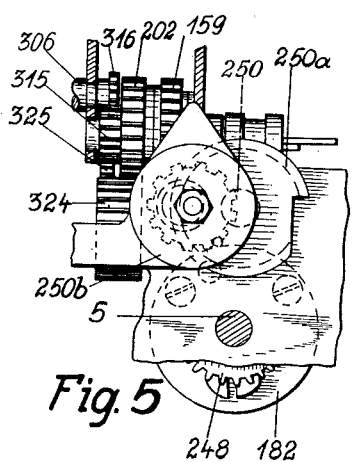
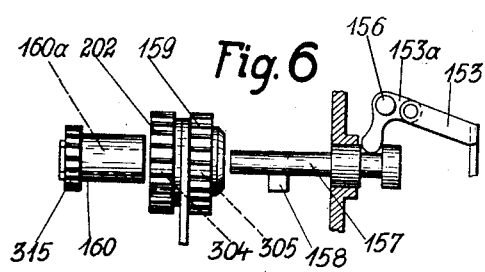
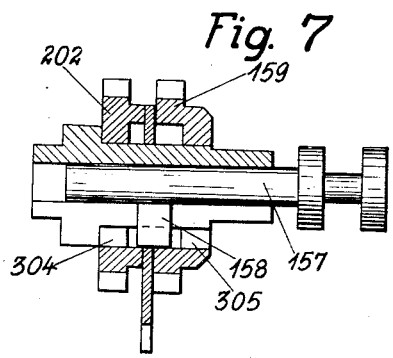
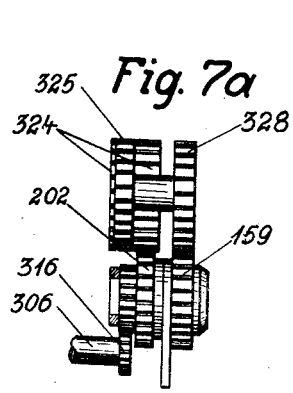
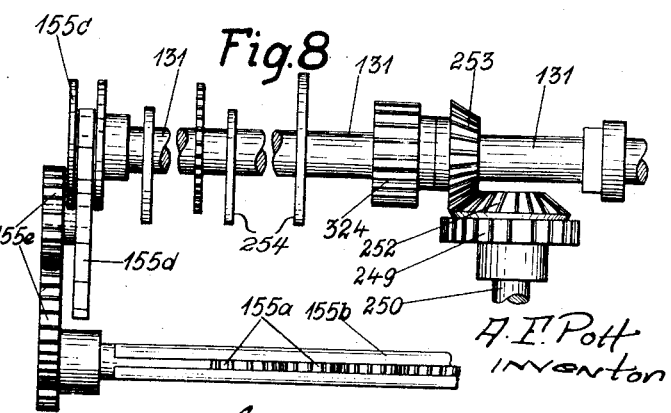

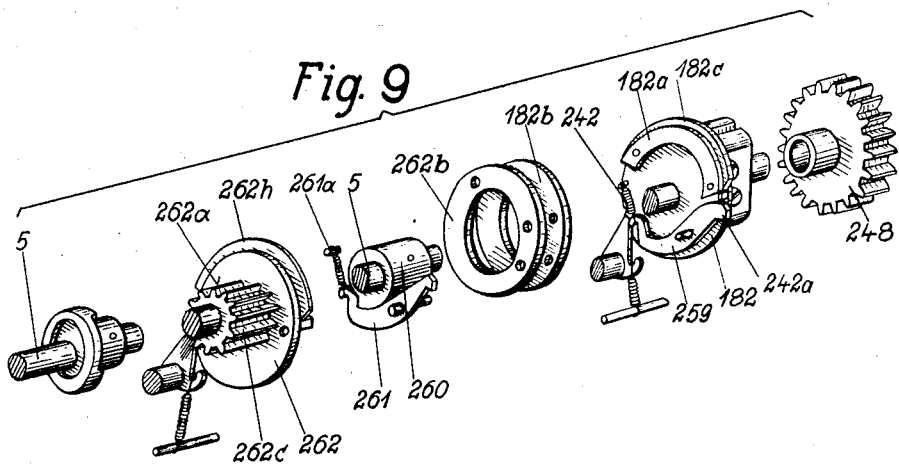
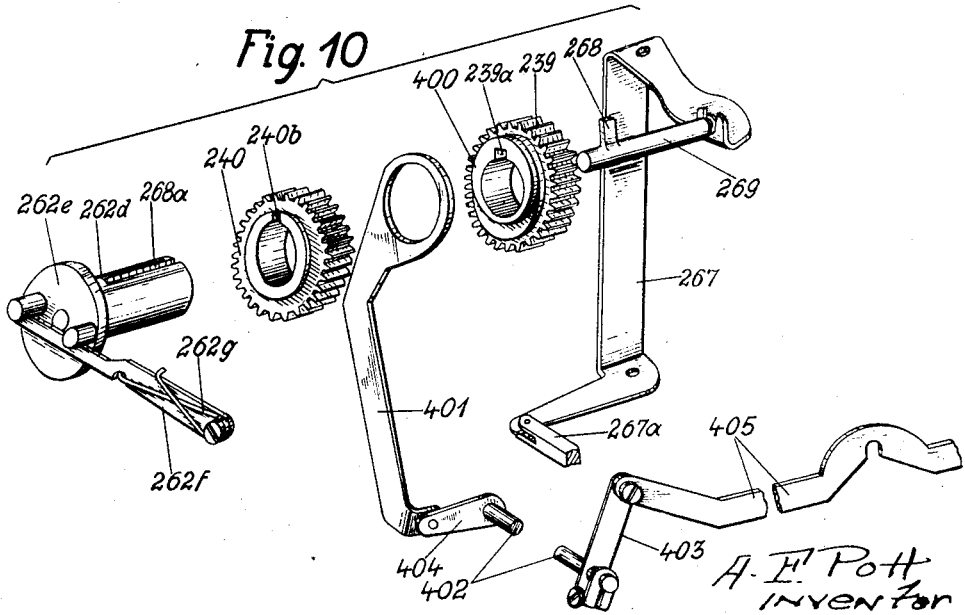

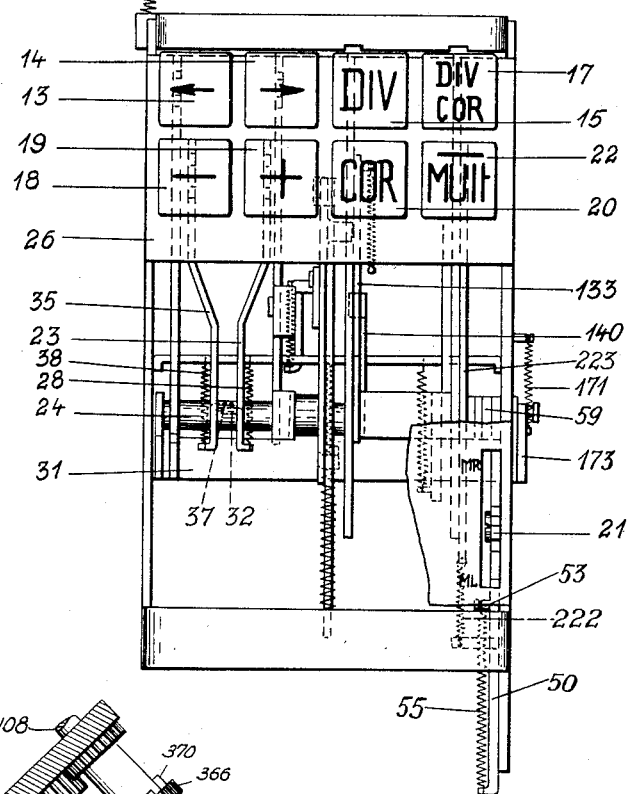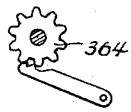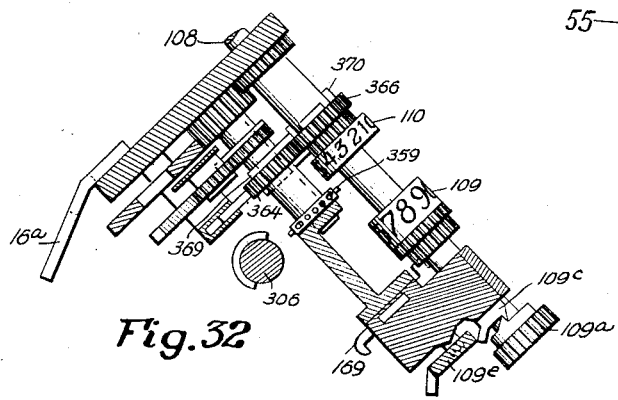

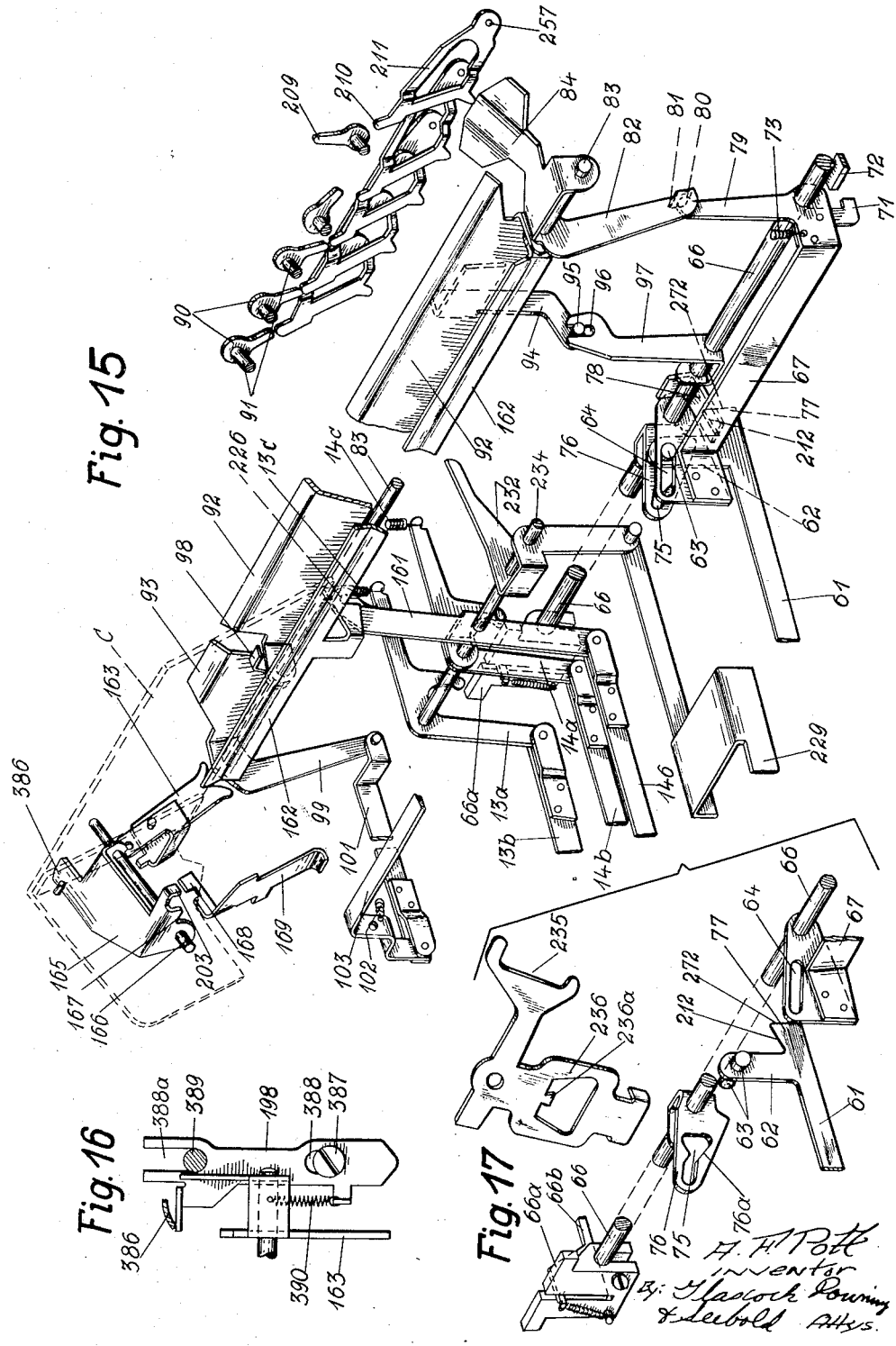

June 30, 1942.  A. F. POTT  2,288,323
CALCULATING MACHINE
Original Filed Sept. 23, 1931  15 Sheets-Sheet 11
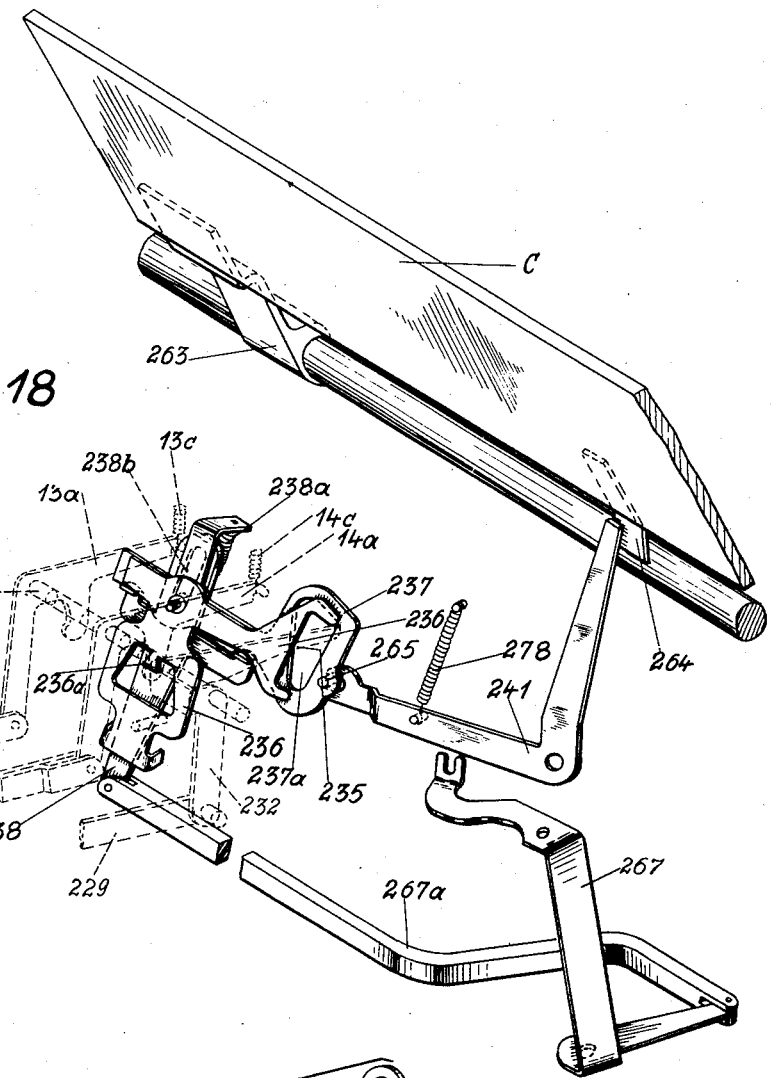
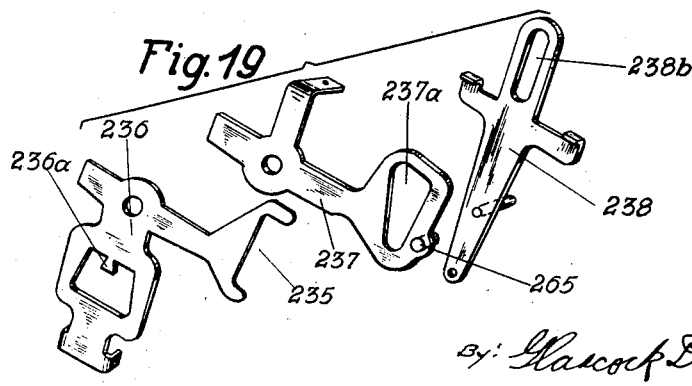

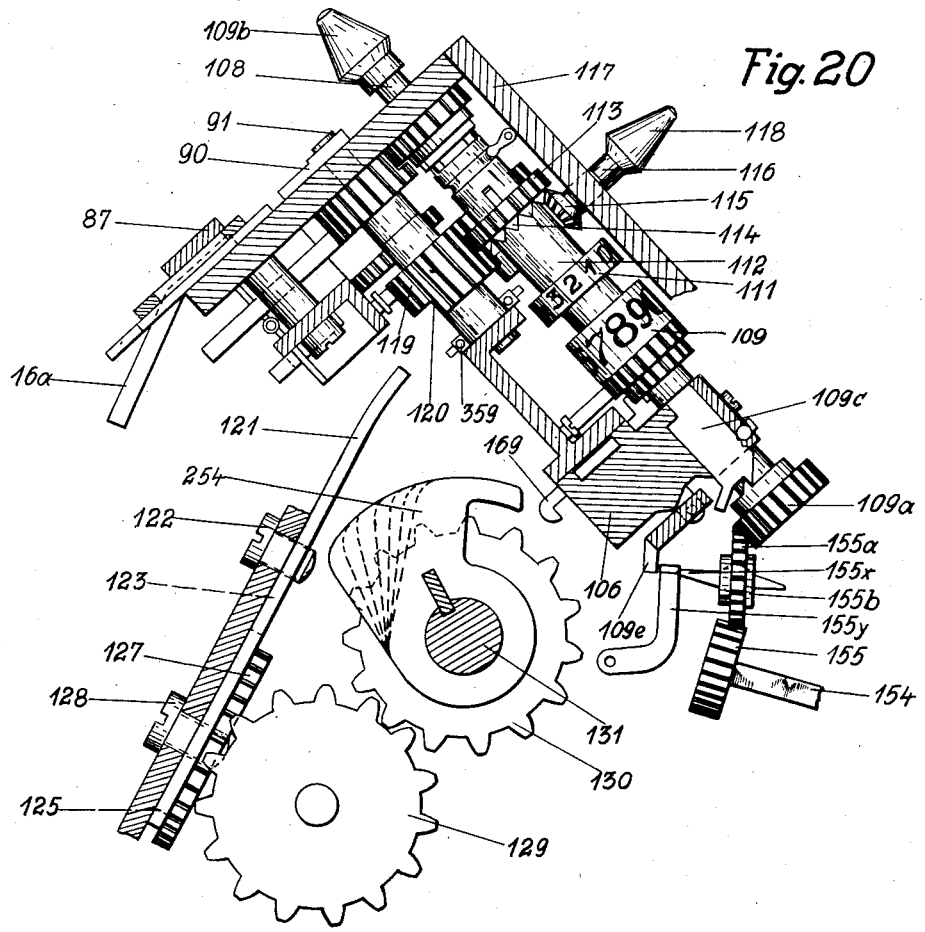
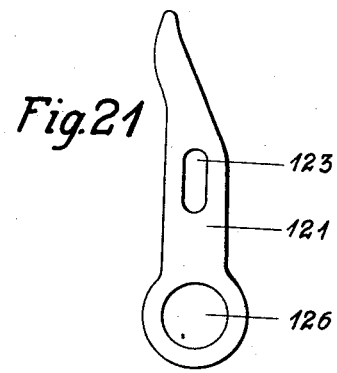

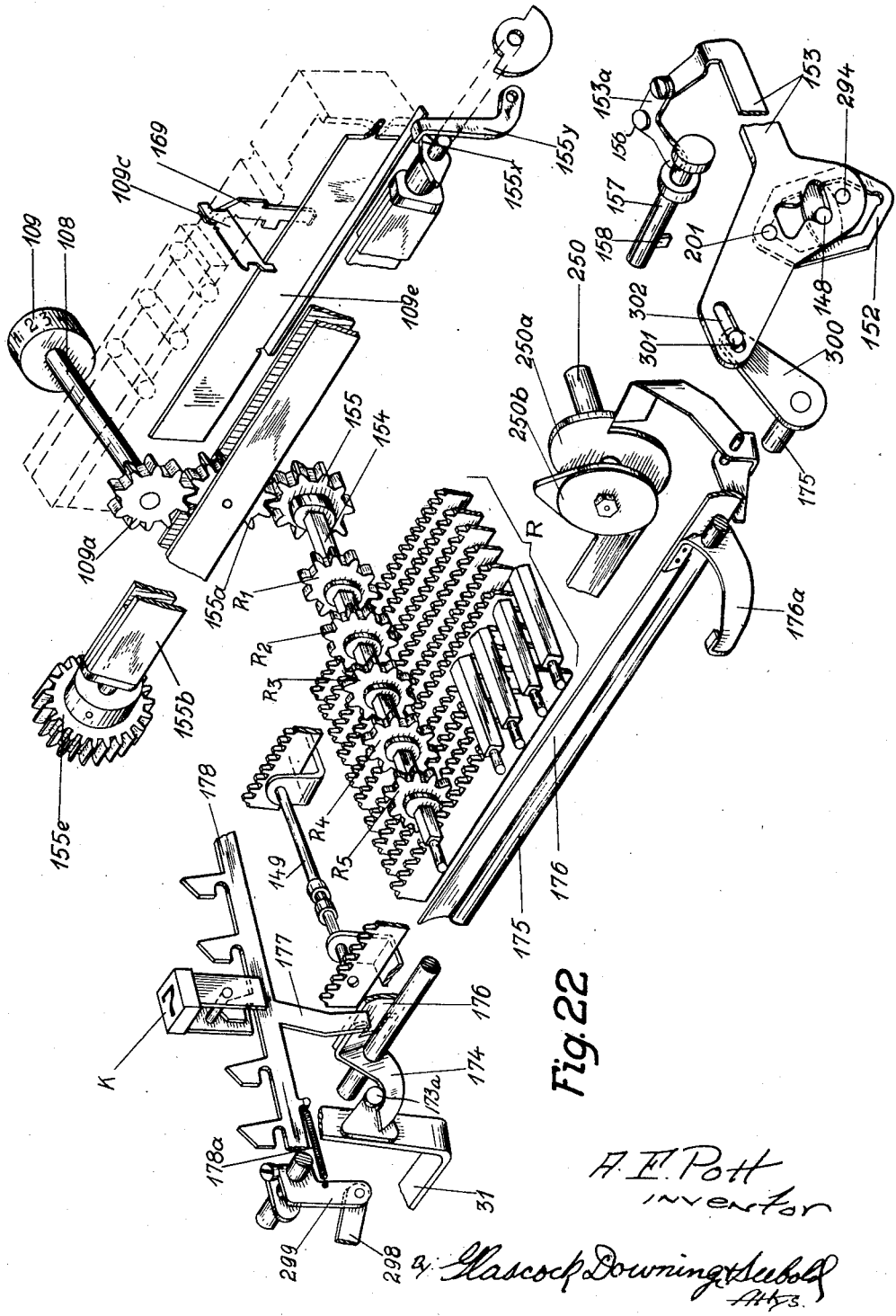

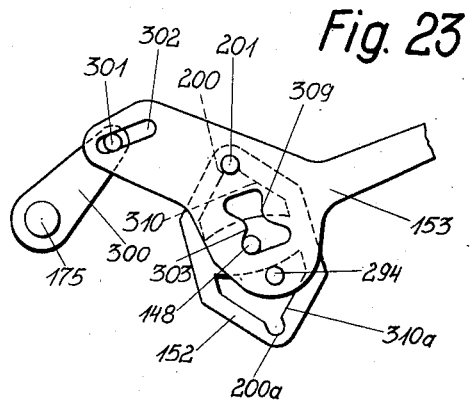
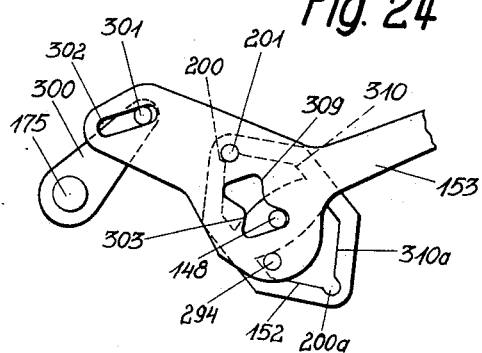
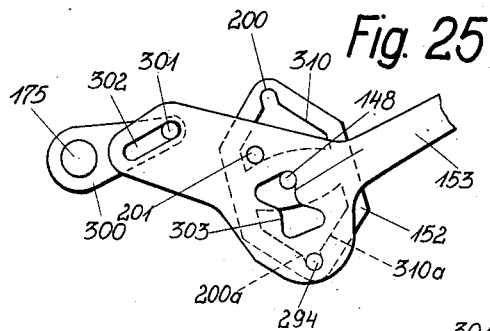
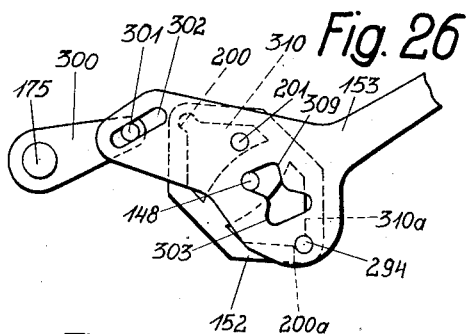
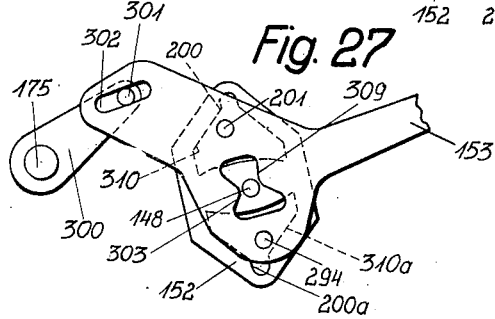

June 30, 1942.  A. F. POTT  2,288,323
CALCULATING MACHINE
Original Filed Sept. 23, 1931   15 Sheets-Sheet 15
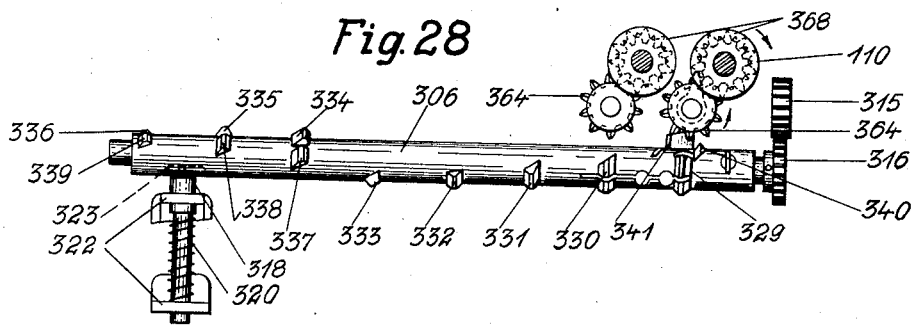
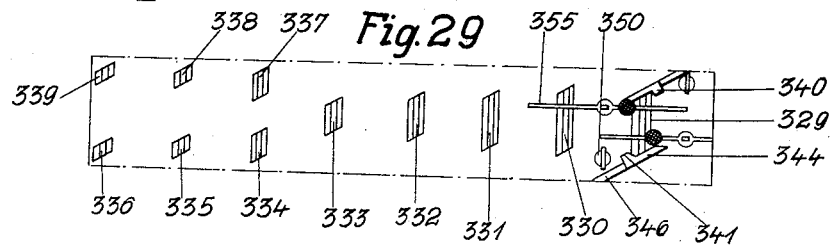
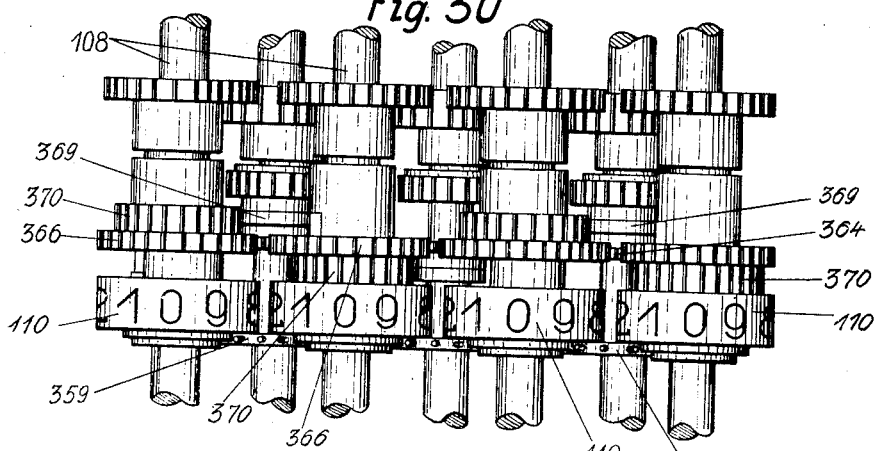
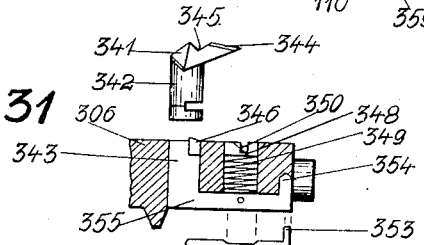

Patented June 30, 1942

2,288,323

UNITED STATES PATENT OFFICE 2,288,323

CALCULATING MACHINE

August Friedrich Pott, Zella-Mehlis, Germany, assignor to Mercedes Buromaschinen-Werke Aktiengesellschaft, Zella-Mehlis, Thuringia, Germany Original application September 23, 1931, Serial No. 564,643. Divided and this application June 10, 1937, Serial No. 147,589. In Germany October 2, 1930

4 Claims. (Cl. 235—62)

My invention relates to calculating mechanism and more particularly to improvements in multiplying mechanism for calculating machines of the Mercedes Euclid type as exemplified in my Patent No. 2,143,741 of which the present application is a division.

The primary object of my invention is to equip a calculating machine of this type for the performance of multiplication in either direction of movement of the accumulator carriage and to provide efficient controls of simplified construction for conditioning the machine for operation as above specified.

Another object is to equip a calculating machine with practical and efficient mechanism for performing of negative multiplication in either direction of movement of said carriage.

Still another object is to provide in a calculating machine including a revolutions counter an efficient correction mechanism by means of which the revolutions counter may be reversed under control of a correction key or disabled by said key at will.

Still another object is to provide mechanism for the purposes above specified which may be readily incorporated in machines of the type previously identified without altering the overall standardized dimensions of such machines.

Other and subordinate objects are also comprehended by my invention all of which together with the exact nature of my improvements will be readily understood when the following description and claims are read with reference to the drawings accompanying and forming part of this specification.

In said drawings:

Fig. 3 is a view in perspective looking at the rear side of the machine,

Figure 11:
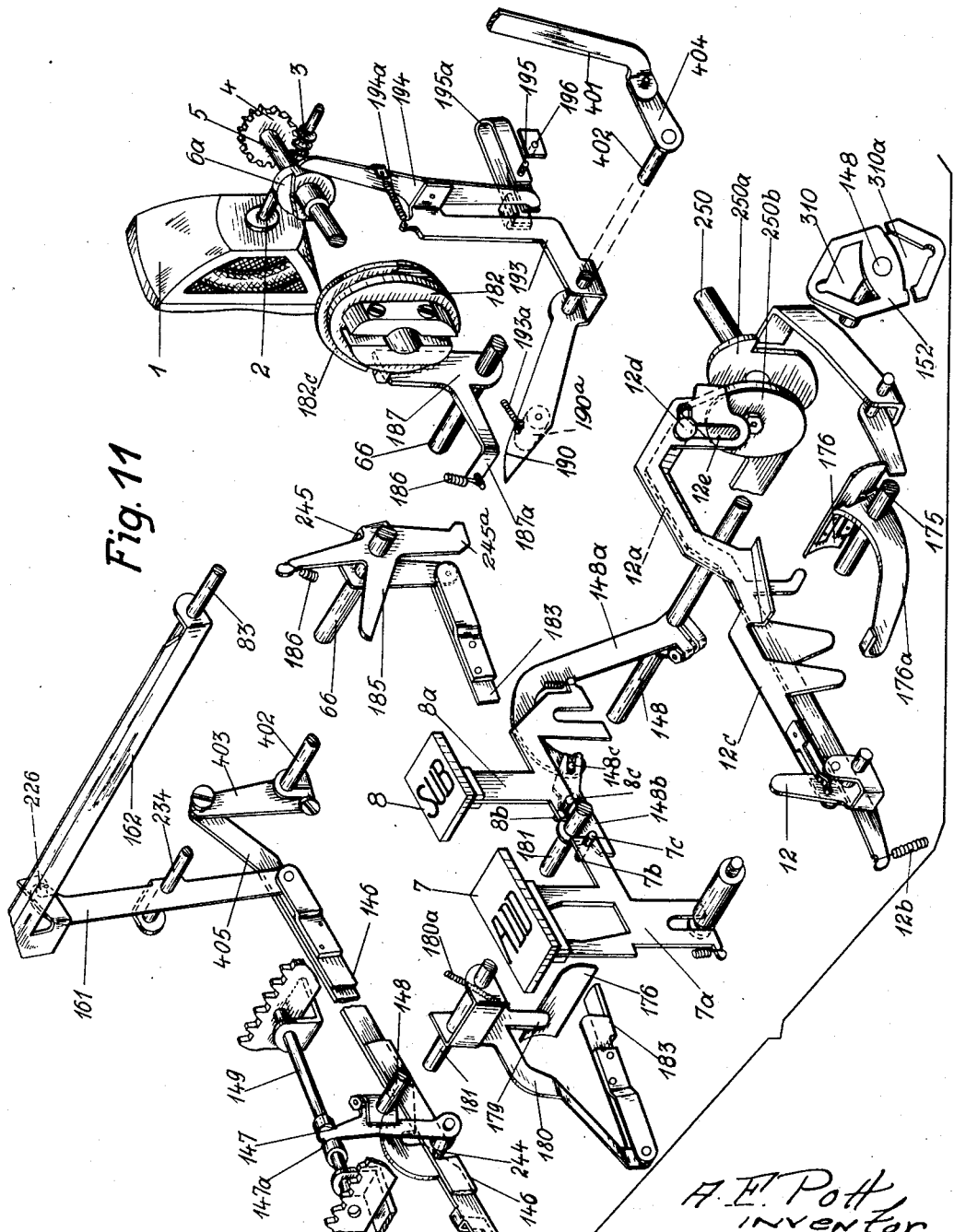

Fig. 4 is a detail view partly in transverse section and partly in side elevation of the main drive shaft of the machine, clutches on said shaft, parts of the carriage reverse mechanism, parts of the drive to the revolutions counter, and parts of the drive to the differential actuators, Fig. 5 is a front elevation of parts shown in Fig. 4, Fig. 6 is a detail plan view of parts of reverse gearing for the revolutions counter, Fig. 7 is a view in longitudinal section of parts of said reverse gearing, Fig. 7a is a plan view of said parts of said reverse gearing with said parts separated for clearness of illustration, Fig. 8 is a fragmentary plan view of coupling mechanism between the value setting up mechanism and the accumulator, Fig. 9 is a view in perspective, with the parts disassembled, of the main drive shaft and the clutches thereon, Fig. 10 is a perspective view of parts of the carriage reverse mechanism and automatic actuator conditioning mechanism the parts being disassembled for clearness of illustration, Fig. 11 is a view in perspective of part of the motor, motor controlling mechanism, the actuator clutch, the clutch control shaft, means for operating said shaft, the actuators, the "add" and "subtract" keys, add-subtract conditioning mechanism for said actuators, cycle controlling or repeat mechanism and parts of the automatic actuator conditioning mechanism and overdraft conditioning mechanism, Fig. 12 is a view in top plan of the special control keys and a key mounting frame therefor.

Figure 13:
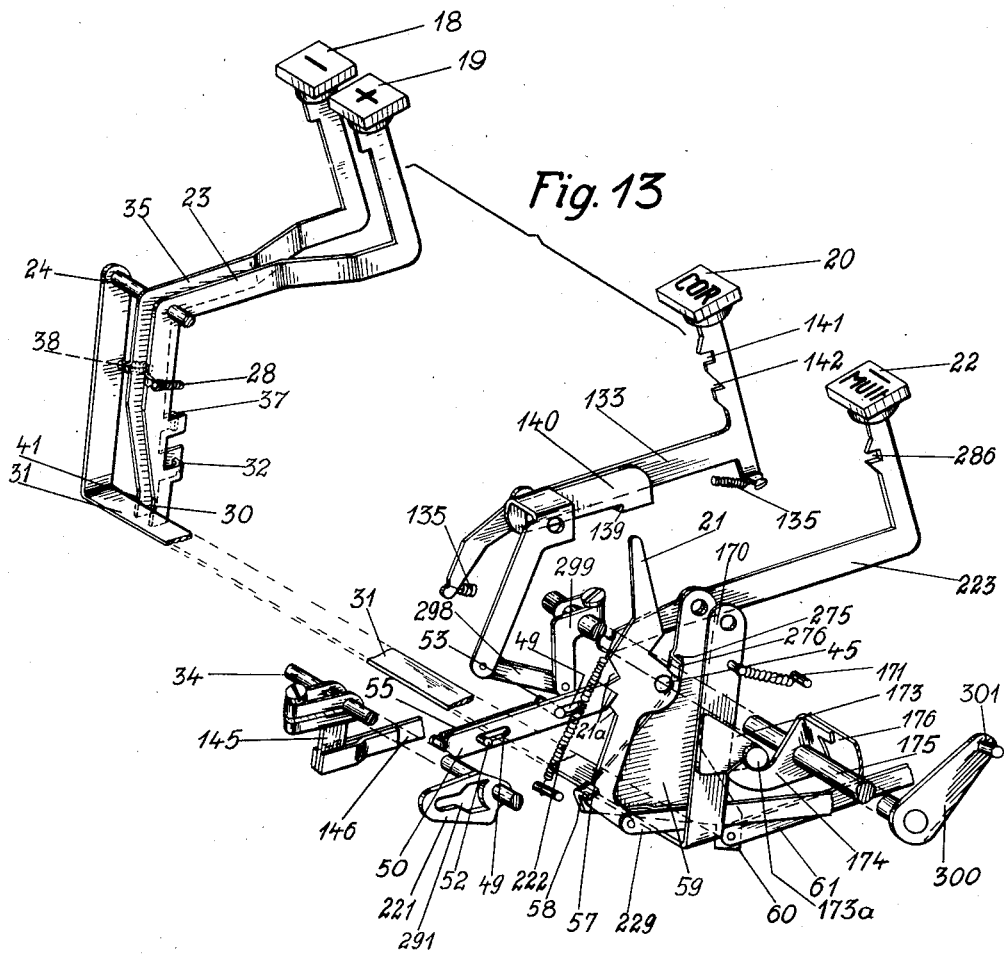
Figure 14:
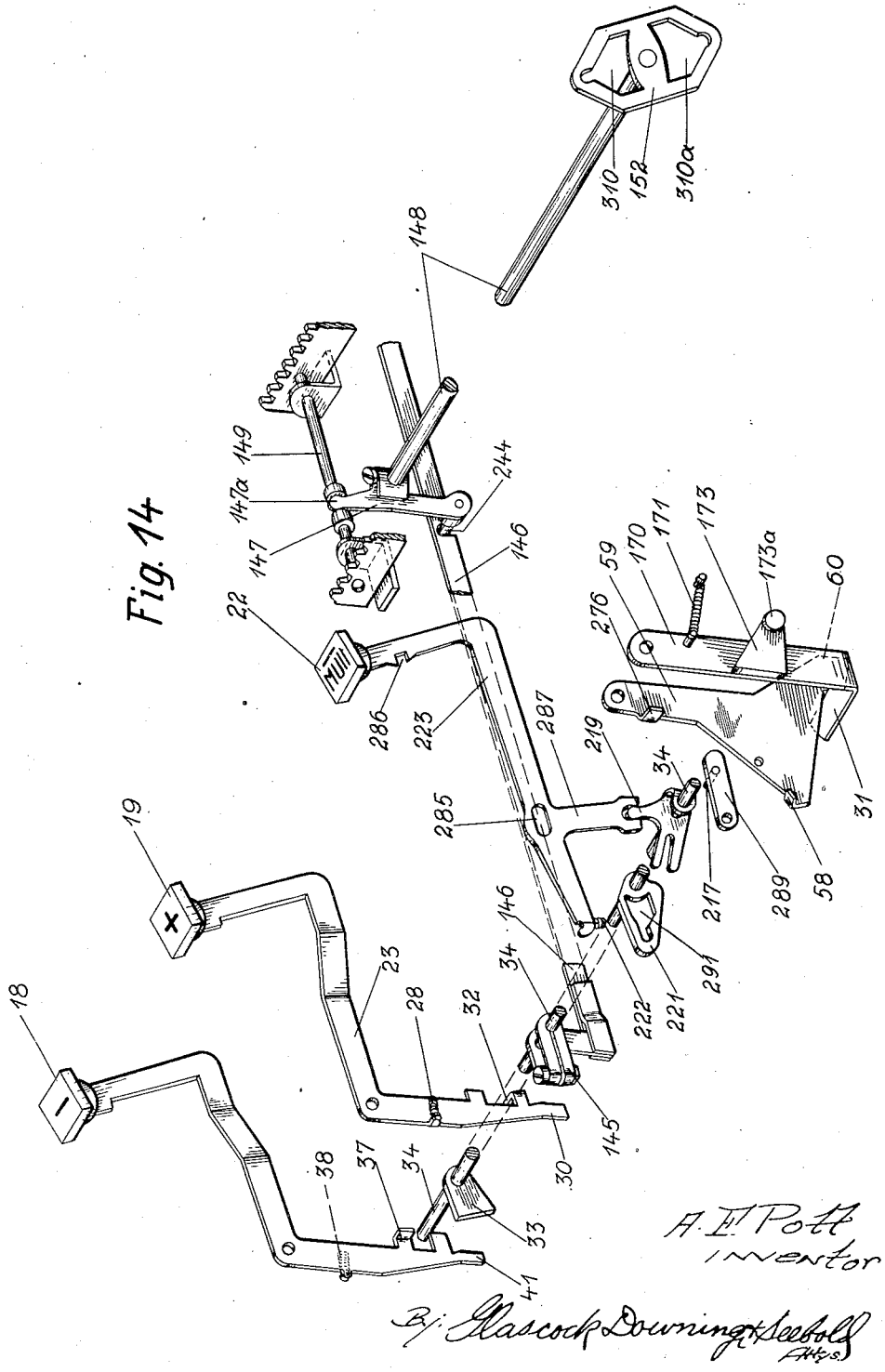

Fig. 13 is a view in perspective of the special control keys and parts directly associated therewith, the keys and parts being separated for clearness of illustration, Fig. 14 is a similar view of the multiplication key, the plus and minus or positive and negative multiplication keys, parts of the actuator conditioning mechanism and connections between said keys and mechanism, Fig. 15 is a view in perspective of the overdraft mechanism, overdraft conditioning mechanism, disabling mechanism, parts of the control mechanism for the carriage, the clutch control shaft, the clutch control flap, and parts of the multiplication mechanism proper, Fig. 16 is a view inside elevation of an overdraft slide forming part of the overdraft mechanism, Fig. 17 is a fragmentary perspective view of the clutch control shaft and parts directly associated therewith.

Figure 1:
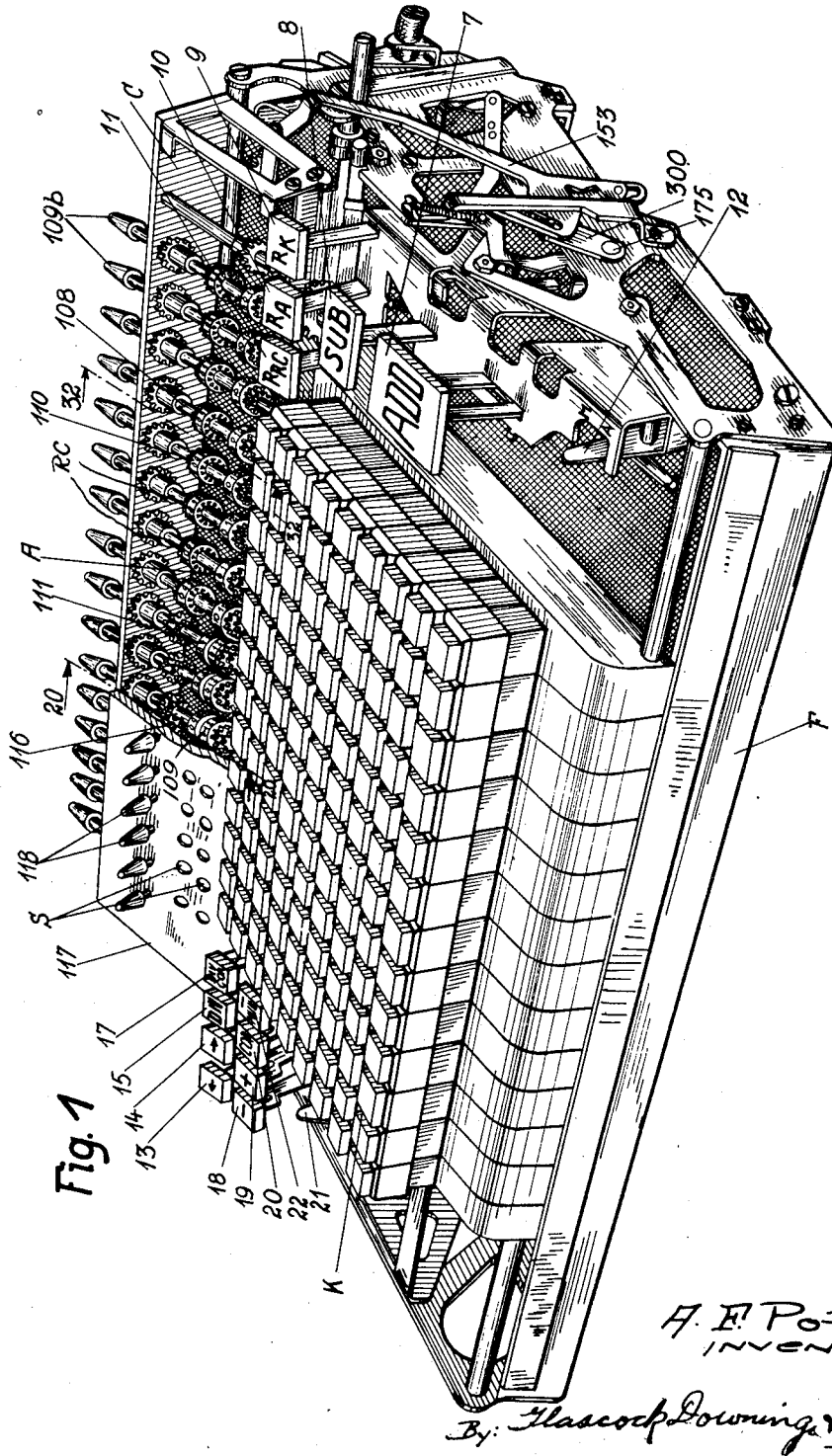
Figure 1 is a view in perspective of a Mercedes Euclid calculating machine equipped according to my invention, the cover plate of the machine being removed and parts broken away to disclose the interior mechanism.

Fig. 18 is a view in perspective of parts of the gear conditioning mechanism for the carriage reverse gearing, Fig. 19 is a group view in perspective of a plurality of levers forming part of the gear conditioning mechanism for the carriage reverse gearing, the levers being shown separated from each other, Fig. 20 is a view in transverse section of the carriage and subjacent parts taken on the line 20—20 of Fig. 1 looking in the direction indicated by the arrows, Fig. 21 is a view in side elevation of a multiplier lever, Fig. 22 is a view in perspective of the differential actuators, the value setting up mechanism, the coupling mechanism between said valve selecting mechanism and the accumulator, parts of the drive to said actuators, one of the key locking bars, the key locking bail, a conditioning crank and a conditioning bar forming part of the revolutions counter conditioning means, and a shaft and crank for setting said bar, Figs. 23 to 27 are views in side elevation, of a counter conditioning crank and conditioning bar together with other parts associated therewith and comprising part of counter conditioning mechanism, the parts being shown in the different positions they assume under different conditions presently referred to in detail, Fig. 28 is a fragmentary view in front elevation of the revolutions counter, the drive shaft therefor and a detent for said shaft, Fig. 29 is a diagrammatic view of said shaft, Fig. 30 is a fragmentary plan view of the revolutions counter with the parts on an enlarged scale to more clearly illustrate their relation, Fig. 31 is a detail view in longitudinal section of the right hand end of the revolutions counter drive shaft, a transfer blade mounted therein and means for mounting said blade, the parts being shown disassembled, Fig. 32 is a view in transverse section of the carriage and subjacent parts taken on the line 32—32 of Fig. 1 looking in the direction indicated by the arrows, Fig. 33 is a detail view of overthrow preventing means for the revolutions counter.

GENERAL ORGANIZATION

The frame F (Figs. 1 to 3) supports at the rear thereof the usual carriage C mounted thereon suitably pivoted for tilting movement for a purpose well understood and denominationally movable, for step by step advance to the right and retraction to the left in the rear of the usual denominational rows of value keys K. The carriage C supports an accumulator A (Fig. 1) and a revolutions counter RC (Fig. 1) adapted to be read through suitable sight openings S in the cover plate 117 of said carriage. The machine is operated by means of a motor 1 (Figs. 3, 11) and a main drive shaft 5 (Figs. 3 to 5, 9, 11) to which the armature shaft 2 (Fig. 11) of said motor is geared by a worm 3 and a worm wheel 4 fast on said armature and drive shafts respectively.

Figure 2:
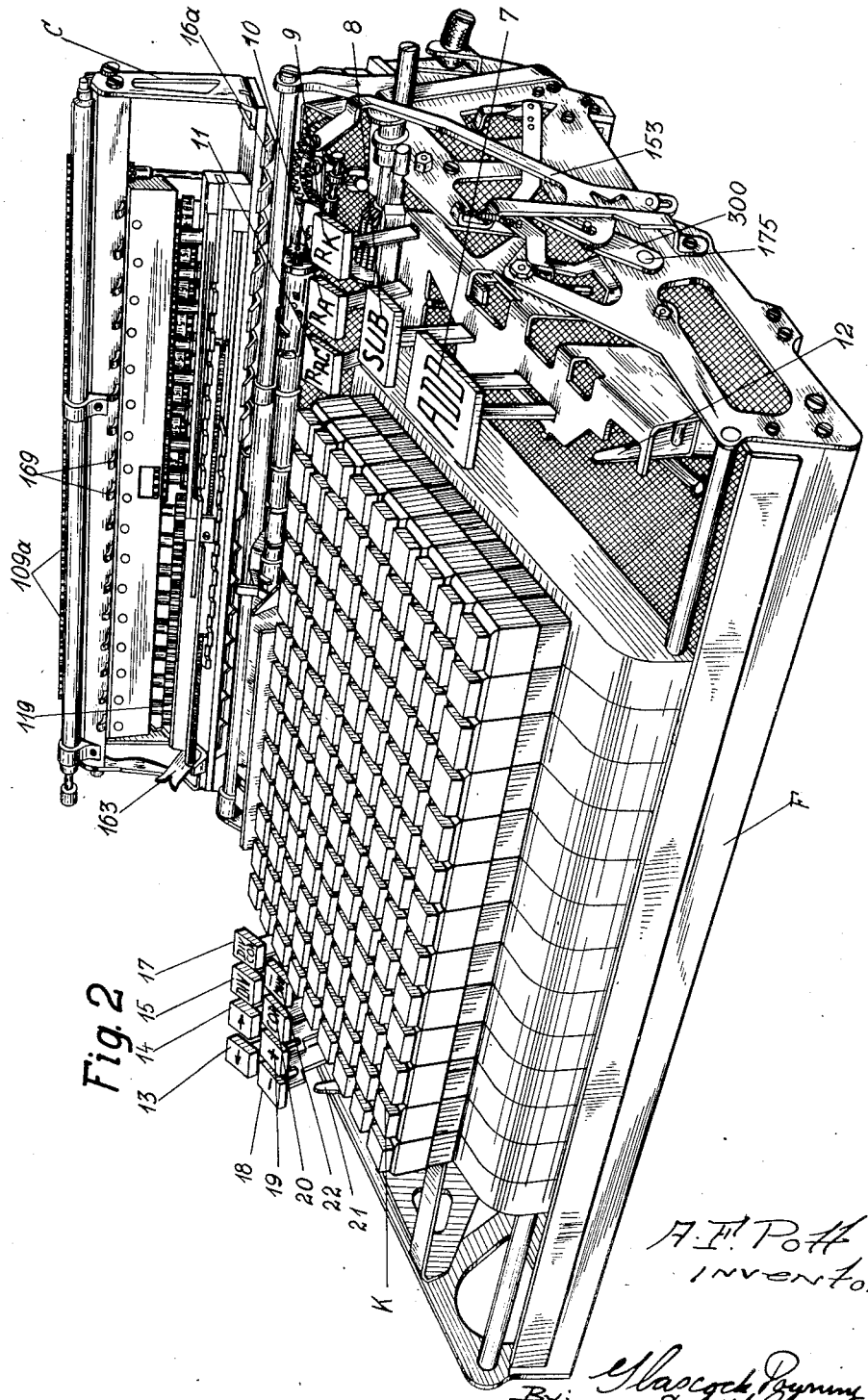
Fig. 2 is a similar view with the carriage of the machine tilted upwardly to illustrate the under side of the mechanism thereon.

Upon opposite sides of the value keys K (Figs. 1, 2) are two groups of special control keys, one including addition and subtraction keys 7 and 8 designated "Add" and "Sub" (Figs. 1, 2, 11), respectively, a keyboard resetting key 9 designated "R$_K$", an accumulator resetting key 10 designated "R$_A$", a revolutions counter resetting key 11 designated "R$_{RC}$" and a repeat key or lever 12 (Figs. 1, 2, 11). The other group includes a pair of carriage shift keys 14 and 13 for carriage advance to the right and retraction to the left respectively, an automatic multiplication lever 21, an automatic minus multiplication key 22 (Figs. 1, 2, 12, 13), plus and minus, or positive and negative multiplication keys 19 and 18, respectively, also a correction key 20, a division key 15 and a division correction key 17 (Figs. 1, 2, 12). Only the automatic multiplication lever 21, the minus multiplication key 22, the plus and minus keys 19 and 18, and the carriage advancing and retracting keys 14 and 13 are material to the present invention. The other keys and lever 12 have been referred to merely to complete identification of the particular type of machine disclosed.

Value setting up mechanism

The value setting up mechanism is substantially the same as that disclosed in U. S. Patent No. 1,935,858 to which attention is directed for a detailed understanding of this part of the machine. Generally speaking said mechanism comprises denominational series of differentially movable gears $R^1$ to $R^5$ (Figs. 22) one series for each denominational row of value keys K, the gears of each series being splined upon a suitably journaled shaft 154 for setting along the same into different positions by their related value keys K. Driving gears, as at 155 (Figs. 20, 22), one of which is fast on each shaft 154, operate the accumulator A through the medium of coupling mechanism presently referred to in detail.

The value keys K are locked depressed by key locking bars, as at 178 (Fig. 22), one for each row of keys, tensioned for movement to locking position by springs, as at 178a, and movable under depression of one value key of a related row to release another depressed key of said row all as disclosed in Patent No. 1,935,858 supra. As will be understood a value set up is retained in the value setting up mechanism by such locking of the value keys.

The differential mechanism

The Mercedes Euclid calculating machine, is an adding mechanism equipped with a well known type of differential mechanism conditionable under control of the "Add" and "Sub" keys 7 and 8 to add in the accumulator A either the actual or the complements of the values set up in the value setting up mechanism. For the details of the differential mechanism attention is directed to U. S. Patent No. 1,011,617.

Briefly described said mechanism comprises a series of ten laterally spaced actuator racks, designated as a unit R in Fig. 22, reciprocable transversely of the machine and with which the before mentioned gears $R^1$ to $R^5$ mesh in their different set positions. Said racks are conditionable for movement in different degree on their forward stroke to rotate said gears in accordance with either the actual or complemental values of the depressed value keys K. Said racks R are conditioned by means of a locking bolt 149 (Figs. 11, 14, 22) slidably mounted for setting in opposite directions to alternately lock the outside racks of said series against movement in addition and subtraction respectively, said bolt projecting through said outside racks as will be understood. The locking bolt forms part of actuator conditioning mechanism to be described.

The accumulator

The accumulator A comprises the usual denominational value wheels 109 (Figs. 1 and 32) having delineated on their peripheries the symbols 0 to 9 and fast upon shafts 108 suitably journaled in the carriage C. In the present instance there are 16 value wheels 109 and shafts 108 although the number of such wheels and shafts may be varied as desired. Fast on the shafts 108 are gears 109a (Figs. 20, 22, 32) driven by the before mentioned coupling mechanism to be described. The usual knobs 109b (Figs. 1, 3, 20) on said shafts 108 are provided for manually setting up values in the value wheels 109 at will. The accumulator A is equipped with transfer mechanism including tens carrying members 169 (Figs. 2, 20, 22, 32) conditioned for transferring operations preparatory members 109c and conditioning resetting or locking flap 109e (Figs. 20, 22, 32). The tens carrying members 169 are operated by transfer cams 254 on a tens carrying shaft 131 (Figs. 8 and 20) and the resetting or locking flap 109e, through the intermediary of the parts 155c, 155e, 155b (Fig. 8), 155x, 155y (Fig. 22) between the same and said shaft 131.

The form of transfer mechanism with which this machine is equipped being well known and understood in the art need not be further described herein. For the details of said mechanism attention is directed to U. S. Patents Nos. 1,011,617 and 1,566,961.

The revolutions counter

Loosely mounted on the eight right hand shafts 108, in the rear of the eight right hand value wheels 109 and related thereto, are eight revolutions counter value wheels 110 (Figs. 1, 28, 30, 32) each having delineated on its periphery the symbols 0 to 9 reversely arranged relative to the symbols on their related value wheels 109. The counter value wheels 110 are rotated step by step through the medium of subjacent star wheels 359 (Figs. 20, 30, 32) related to said wheels respectively, and each having fast thereon a gear 364 (Figs. 28, 30, 32) meshing with a gear 366 fast on the related value wheel 110 (Figs. 30, 32). Each gear 364, except that related to the value wheel 110 of highest denomination, is provided with a transfer tooth 369 (Figs. 30, 32) adapted upon rotation of the value wheel 110 related to said gear from 9 to 0, or, vice versa, to engage a transfer gear 370 (Figs. 30, 32) on the value wheel of next higher denomination and to impart a half step of rotation thereto. Below the star gears 359 is a tens carrying shaft 306 (Figs. 7a, 28, 29, 31, 32) suitably journaled in the main frame F transversely thereof to extend lengthwise of the revolutions counter RC. The tens carrying shaft 306 is equipped to drive and complete the transferring operations in the revolutions counter RC as follows. Adjacent the right hand end of said shaft 306 is a pair of opposed transfer blades 340 and 341 (Figs. 28, 29, 31) spaced apart transversely of said shaft and inclined lengthwise thereof. The transport pieces 340 and 341 (Fig. 28) are so arranged that in successive denominational positions of the carriage C said blades, during each revolution of said shaft in opposite directions, impart a complete step of movement to successive star wheels 359 in opposite directions, respectively, and consequently to the counter value wheels 110. It will of course be understood that the revolutions counter operates in opposite directions in additive and subtractive operations respectively. Extending along said shaft 306 transversely thereof, from said blades 340, 341 are equidistantly spaced rib-like transport pieces 329 to 339 (Fig. 28) arranged in like formation so that ends thereof form oppositely related spirals around said shaft 306 as shown diagrammatically in Fig. 29. One end of the transfer pieces 330 to 333 and the pieces 337 to 339 (Fig. 28) are effective in one direction of rotation of said shaft 306 to impart a half step of movement to the star wheels 359 of the value wheels 110 to which a half step of transfer movement has been imparted by transfer tooth 369 (Figs. 30, 32) whereby transferring as regards said wheels is completed. The other ends of said pieces 330 to 333 and the pieces 334 to 336 (Fig. 28) are effective in the other direction of movement of said shaft 306 to similarly operate said star wheels 359 and hence related value wheels 110 in the opposite direction. The pieces 340, 341 are yieldingly mounted in the shaft 306 to normally project therefrom and so that upon continued rotation of said shaft in either direction the trailing piece will be depressed into said shaft 306 by wiping engagement with the star wheels 359 out of interfering relation to said gears. To this end each piece 340 or 341 is disposed in a through slot 343 (Fig. 31) in the shaft 306 and provided with a notched cylindrical shank 342. The notch of said shank 342 is engaged by a detent bar 352 (Fig. 31) counter sunk in a second slot 355 extending at a right angle to the slot 343. An angled end 353 on said detent bar seating in a socket 354 in the bottom of the slot 355 holds said bar against endwise displacement. A tension spring 349 (Fig. 31) disposed in a bore 348 in said shaft 306 and having its opposite ends connected to a plug 350 in said bore and to said detent bar 352 respectively retains the latter against the bottom of the slot 355 and thereby holds the piece in projected position. Each piece 340, 341 is notched as at 345 and formed with a lug 344 seating in a socket 346 for a purpose immaterial to the present invention and which therefore need not be entered into herein. As will be understood, the pieces 340, 341 and the transfer pieces 329 to 339 are spaced around the shaft 306 so as to permit in the normal position of said shaft, movement of the star wheels 359 along said shaft by the carriage C. The shaft 306 is yieldingly held in normal position (Fig. 28a) by means of a locking bolt 318 mounted in fixed brackets 322 and a tension spring 320 urging one end of said bolt into a suitable socket 323 provided in said shaft.

The carriage drive

On the main drive shaft 5 is a carriage driving clutch 262 of the single revolution type (Figs. 4 and 9) comprising a pair of opposed circular housing members 262a—262b (Fig. 9), a ratchet sleeve 260 fast on said shaft 5, and a clutch trip pawl 261 pivotally mounted between said members 262a, 262b for engagement with said ratchet sleeve and tensioned by a suitably connected spring 261a to engage said sleeve. The clutch 262 is geared to the usual carriage propelling rack 16a (Figs. 20 and 32) as follows. Fast on the housing member 262a (Figs. 4 and 9) is a carriage driving gear 262c. Suitably journaled on the main frame F is a carriage driving sleeve 262d (Fig. 10) having fast on one end thereof a pin gear 262e meshing with the carriage rack 16a. A detent lever 262f tensioned by a suitably arranged spring 262g (Fig. 10) for cooperation with said pin gear 262e to urge the same in normal position and prevent overthrow thereof. A pair of carriage reversing gears 239, 240 (Figs. 4, 10) are rotatably mounted on said sleeve 262d said gears constituting right and left hand driving or carriage advancing and retracting gears respectively. The carriage advancing gear 239 meshes with the carriage driving gear 262c. The retracting gear 240 is driven by said gear 262c oppositely to the advancing gear 239 through the medium of an idler gear 240a (Fig. 4). The carriage advancing and retracting gears 239, 240 are adapted to be alternately coupled to said sleeve 262d (Fig. 10) by means of a draw key 269 having a key lug 268 therein projecting through a key way 268a in said sleeve and endwise settable in opposite directions to engage said lug 268 with key ways 239a and 240b provided in said gears 239 and 240, respectively, whereby in the opposite settings of said key 269 the described reverse gearing is conditioned for advance to the right or retraction to the left of the carriage C respectively.

The draw key 269 is settable to condition the described carriage reverse gearing for advance and retraction of the carriage under control of the carriage advancing and retracting keys 14 and 13 and the carriage C through the medium of the following gear conditioning mechanism. Pivotally mounted side by side on the back of the machine (Figs. 3, 17, 18, 19) is a gear conditioning lever unit comprising three levers 236, 237, 238 interconnected for unitary swinging movement in opposite directions about an horizontal axis and also for relative movement. The purpose of such relative movement is however unimportant to the present invention and need not be described. The levers 236 and 237 (Figs. 3, 18, 19) are recessed as at 235 and 237a respectively for a purpose which will be later pointed out in detail. The lever 238 is pivotally connected at its lower end to a rod 267a which is pivotally connected to a draw key setting lever 267 (Figs. 3, 10, 18) operatively connected to said key 269. The draw key 269 is normally set to condition the described carriage reverse gearing for retraction to the left of the carriage C by means of a rocking bell crank 241 (Figs. 3, 18) suitably mounted on the frame F and operatively connected to the intermediate lever 237, as at 265, and a suitably connected spring 278 urging said bell crank 241 and lever 237 in the proper direction (Fig. 3). The carriage advancing and retracting keys 14 and 13 are operatively related to said gear conditioning unit by means of a pair of bell cranks 13a and 14a (Figs. 3, 15, 18) adapted to swing said unit in opposite directions, respectively, a pair of links 14b, 13b operatively connect said keys 14 and 13 to the bell cranks 14a and 13a respectively. Suitably connected springs 14e and 13c (Figs. 3, 15, 18) tension said bell cranks 14a and 13a, respectively, against operation by said keys and said keys against depression. The condition of the carriage reverse gearing under depression of the keys 14 and 13 is reversed in the left and right hand limits of movement of the carriage C, by means of right and left hand tappets 264, 263 (Figs. 3, 18), respectively, mounted on said carriage and coacting with the before mentioned bell crank 241 to rock the described gear conditioning unit in opposite directions respectively.

Under depression of the carriage advancing and retracting keys 14 and 13 the bell cranks 14a and 13a engage a crank member 66a (Fig. 17) fast upon a transverse clutch control rock shaft 66 and rock the latter, clockwise as viewed in Figs. 11, 15, and 17, to effect engagement of the carriage clutch 262 in a manner to be described.

It may be mentioned that the clutch control shaft 66 is interlocked with the lever 236 of the described gear conditioning unit under sustained depression of the carriage advancing key 14 by means of coacting parts 66b, 236a (Fig. 17) on the crank 66a and lever 236, respectively, so that the carriage C continues to advance to the right until said key is returned in the limit of right hand movement of said carriage by coaction of the left hand tappet 263 (Figs. 3, 18) and bell crank 241 to swing the gear conditioning unit in a direction to condition the carriage reverse gearing for retraction of said carriage. Also under depression of the retracting key 13 similar results are obtained as regards retraction to the left of said carriage C and return of key 13. The spring 238a and the slot 238b in the lever 238 (Figs. 3, 18) together with the other features set forth in this paragraph form per se, no part of the present invention being subject matter of my co-pending application Serial No. 147,587, filed of even date herewith. Therefore further description thereof is thought to be unnecessary to a proper understanding of the instant invention.

*Drive to accumulator*

On the main drive shaft 5, alongside the carriage clutch 262 and identical in construction therewith is an actuator driving clutch 182 comprising housing members 182a, 182b, (Figs. 4, 9) a clutch trip pawl 259 therebetween and a spring 242 tensioning said pawl for engagement with the beforementioned ratchet sleeve 260. Clutch member 182a is operatively connected to a suitably journaled driving shaft 250 (Figs. 4, 5) by means of intermeshing gears 248, 249 fast on said member and shaft respectively. The driving shaft 250 is operatively connected to the differential actuators R (Fig. 22) to impart a reciprocatory cycle of operation thereto during each revolution of the actuator clutch by means including a crank disk 250a fast on said shaft and a connecting rod 250b (Figs. 4, 5, 22). For a detailed disclosure of the connecting means indicated generally herein attention is directed to the previously noted Patent 1,011,617. The before mentioned transfer shaft 131 is also driven by the driving shaft 250 by means of intermeshing bevel gears 252, 253 (Figs. 4 and 8) fast on said driving and transfer shaft respectively.

As previously stated the driving gears 155 (Figs. 20, 22) of the value setting up mechanism operate the accumulator A by means of coupling mechanism. Said coupling mechanism best shown in Fig. 22 comprises a series of denominational gears 155a rotatably mounted in a coupling gear frame 155b which in suitable manner is rotatably mounted in the main frame F to intermittently mesh said gears 155a with gears 155 and gears 109a on the shafts 108 (Figs. 20, 22). Intermittent rotation is imparted to the frame 155b by the transfer shaft 131 (Figs. 8, 20) through operating connections comprising a pin gear 155c (Fig. 8) fast on said transfer shaft and meshing with a suitably mounted two part Maltese cross 155d and a gear train extending between said Maltese cross 155d and the shaft 155b and designated generally by the reference character 155e (Figs. 8, 22). For the present purposes it is sufficient to explain that the described coupling mechanism serves for coupling the value setting up mechanism to appropriate gears 109a during each forward stroke of the actuators R and uncoupling the same during return strokes of said actuators.

Drive to revolutions counter

The revolutions counter driving shaft 306 (Fig. 28) is driven in opposite directions in addition and subtraction by the transfer shaft 131 through the medium of a reverse gearing as follows. Fast on said shafts 306 and 131 are gears 324 and 316 respectively (Figs. 4, 5, 8, 28). A sleeve 160 (Fig. 6) similar to sleeve 262d before described, is suitably journaled on the main frame F said sleeve having a gear 315 fast thereon meshing with the gear 316. A pair of forward and reverse driving gears 159, 202 (Figs. 5, 6, 7a) for addition and subtraction, respectively, are freely mounted on said sleeve 160. The forward driving or addition gear 159 is driven by the gear 324 through integral twin gears 325, 328, (Fig. 7a), the gear 325 meshing with gear 324 and the gear 328 meshing with gear 159 whereby the shaft 306 and value wheels 110 are driven in the directions indicated by the arrows in Fig. 28. The reverse driving or subtraction gear 202 (Figs. 5, 6) meshes directly with gear 324 whereby said shaft 306 and value wheels 110 are driven in directions opposite to those indicated by said arrows (Fig. 28). A draw key 157 (Figs. 6, 7), similar to draw key 269, is settable in said sleeve 160 in opposite directions to alternatively couple said gears 159, 202 to said sleeve by means of a key lug 158 on said key, a key way 160a in said sleeve and key ways 305, 304 (Fig. 6) in said gears 159, 202 respectively. The draw key 157 is also settable into an intermediate position represented in Fig. 7 in which both gears 159, 202 are uncoupled from said sleeve 160 and the revolutions counter RC thereby disabled. The setting of the draw key 157 is accomplished by means which will presently be described under appropriate headings.

Add and subtract conditioning means

At this point the add and subtract conditioning mechanism which forms in part a part of the multiplication mechanism will be briefly described.

The basic element of said add and subtract conditioning mechanism is a transverse conditioning rock shaft 148, at the rear of the machine (Fig. 11), upon one end of which an actuator conditioning crank 147 is secured, intermediate its ends, with one end operatively connected, as at 147a to the before mentioned locking bolt 149 so that upon rocking movement of said shaft 148 in opposite directions said bolt will be set to condition the actuators R for addition and subtractions respectively. The crank 147 has a lateral stud 244 (Figs. 11, 14) on its opposite end the function of which will presently appear. Between the "Add" and "Sub" keys 7 and 8 and shaft 148 are operating connections designated 148a, 148b, 148c (Fig. 11), operated by studs 7b, 8b of the key levers 7a, 8a of the "add" "sub" keys 7 and 8, respectively, whereby depression of said keys 7 and 8 (Fig. 11) effects rocking of said shaft 148 in opposite directions said connections permitting independent rocking of said shaft. Since the details of said operating connections are immaterial to the instant invention they need not be described herein.

As an incident to such rocking of the conditioning shaft 148 to condition the actuators R for addition or subtraction the revolutions counter RC is similarly conditioned by means of a vertically disposed conditioning crank 152 fast intermediate its ends on said shaft 148 (Figs. 11, 14, 22, 23–27). A draw key setting bell crank 153a (Figs. 6, 22), pivoted at a fixed point 156 is pivotally connected with a bar 153 in such manner as to accommodate vertical movement of the latter. The crank 152 (Figs. 22–27) has formed therein a pair of upper and lower substantially triangular recesses 310, 310a, respectively, and notches 200, 200a are formed at the apexes of said recesses 310, 310a as shown in Figs. 22 to 27. The bar 153 is provided with upper and lower studs 201, 294, respectively, arranged thereon so that upon vertical movement of said bar 153 in opposite directions said studs 201, 294 may be engaged with said upper and lower notches respectively. Under normal adding and subtracting conditions the bar 153 is held elevated by a crank 300 (Figs. 1, 2, 13, 22–27) fast on a transverse correction rock shaft 175 and having a slot and pin connection 302, 301 (Figs. 22–27) to said bar. In this position of the parts the upper stud 201 of said bar 153 engages the upper notch 200 of said crank 152 whereby upon movement of the conditioning rock shaft 148 in opposite directions the draw key 157 (Figs. 6, 7, 7a) is set in opposite directions to condition the counter reverse gearing and hence the counter RC for addition and subtraction.

It may be explained at this point that in correction operations the bar 153 is moved or set vertically into an intermediate position by the correction shaft 175 (Figs. 22–27) and crank 300 in which position a slot 303 in said bar 153 coacts with one end of the shaft 148 to cam said bar endwise to effect a setting of the draw key 157 into its intermediate position previously referred to whereby the revolutions counter RC is disabled as previously explained. The triangular recesses 310, 310a coact with the studs 201, 294 to cam the same into the notches 200, 200a when bar 153 is in its upper or lower position.

Returning now to the carriage C and actuator clutches 262, 182 (Figs. 4, 9, 11), said clutches are controlled by means of a clutch tripping dog 187 (Figs. 4, 11) fast on the previously identified clutch control shaft 66 and together with said shaft normally occupying an intermediate position in which both trip pawls 261, 259 (Fig. 9) are tripped and said clutches thereby disengaged. The clutch control shaft 66 and clutch tripping dog 187 as will be understood are adapted to be rocked in opposite directions into carriage and actuator clutch engaging positions respectively, to effect alternate engagement of said clutches 262, 182. A pair of segmental cams 262h, 182c (Fig. 9) on the clutches 262, 182, respectively, block movement of the clutch tripping dog 187 to said positions until whichever clutch is engaged has completed a full revolution.

The clutch control shaft 66 is rocked in one direction under control of the "add" and "sub" keys 7 and 8 through the medium of a key locking bail 176 (Figs. 11, 22) swingable forwardly and rearwardly on the before mentioned correction shaft 175. The key locking bail in its forward movement coacts with arms 177 (Fig. 22) on the before mentioned key locking bars 178 and blocks movement of the latter to key releasing position. Also in its forward movement said bail 176 coacts with an arm 179 (Fig. 11) on a yoke 180 pivotally mounted on a transverse shaft 181 and swings said yoke forwardly against the tension of a suitably connected spring 180a. The yoke 180 is operatively connected by a link 183 to a clutch control rocker 245 (Fig.

11) swingable on clutch control shaft 66 whereby said rocker is moved in one direction from normal position that is to say clockwise as viewed in Fig. 11. A tension spring 186 operatively connects said rocker 245 to an extension arm 187a of said clutch tripping dog 187 so that such swinging of said rocker tensions said spring whereby said dog 187 is urged into actuator clutch engaging position. An extension arm 185 (Fig. 11) on the rocker 245 overlies the extension arm 187a of said dog and rocks the latter and the shaft 66 back into normal intermediate position upon return of said rocker to normal position. The before mentioned spring 180a returns the rocker 245 to normal position as will be understood.

The operating connections between the "add" and "sub" keys 7 and 8 and the key locking bail 176 comprise a swingable and shiftable lever 12a swung downwardly under depression of either of said keys by the studs 7c, 8c (Fig. 11) on the key levers 7a, 8a which studs overlie said lever 12a in the normal position of the latter. A suitably connected spring 12b (Fig. 11) tensions said lever 12a against movement from normal position. The lever 12a coacts with a crank arm 176a on the bail 176 to rock the latter. Alongside the lever 12a is a slide 12c (Fig. 11) endwise settable in opposite directions by the previously identified repeat lever 12, and laterally shiftable. The lever 12a and slide 12c are coupled together for unitary lateral movement by a stud 12d on the former and a bayonet slot 12e in the latter permitting independent swinging and setting of said lever and slide, respectively. In one setting of said slide 12c a cam 250b on the before mentioned crank disc 250a shifts said slide 12c and lever 12a laterally at the end of each cycle of operation of the machine so that said lever 12a clears the studs 7c or 8c of whichever key 7 or 8 is held depressed whereby said lever 12a is free to rise under the urge of the spring 12b (Fig. 11). It will of course be understood that following such rise of said lever 12a the key locking bail is returned to normal position by the tensioned yoke 180 and the clutch tripping dog 187 to normal intermediate position in which both clutches 262, 182 are disengaged. In the opposite setting of each slide 12c the cam 250b is ineffective thereagainst and the machine executes repeated cycles of movement as long as a key 7 or 8 is held depressed.

The motor 1 is energized by means of a pair of fixed and movable contacts 196, 195 (Fig. 11), respectively, the latter is secured to a resilient contact carrier 195a (Fig. 11). The contacts 196, 195 are opened and closed under control of a cam 6a fast on the main drive shaft 5, a contact opening and closing lever 194 pivoted intermediate its ends on a carrier 193 for movement thereon by said cam to open and close said contacts and a suitably connected spring 194a urging said lever into engagement with said cam. The carrier 193 is mounted for rocking movement against the tension of a spring 193a to shift said lever relative to said cam 6a from a normally ineffective to an effective position. The carrier 193 is rocked to move the lever 194 to effective position by the rocker 245 through the extension arm 245a of said rocker which coacts with a roller 190a on said carrier 193. Obviously when the clutch tripping dog 187 is returned to normal intermediate position the carrier 193 is returned by the spring 193a the contacts 196, 195 are opened and the motor is brought to rest.

Overdraft mechanism

The machine is equipped with overdraft mechanism as follows: A horizontally disposed overdraft flap 165 is mounted on a short shaft 166 on the carriage C (Fig. 15) for sliding adjustment forwardly and rearwardly into either of two set positions to condition said mechanism relative to the tens carrying member 169 of highest denomination and for downward pivotal movement by said member. The overdraft flap 165 is provided along one edge with a pair of laterally spaced lugs 167, and 203 (Fig. 15) adapted in the different set positions of said flap 165 to be aligned with a lug 168 on said member 169 respectively. As clearly disclosed in the aforesaid Patent No. 1,935,858 the tens carrying members, in this type of transfer mechanism, are moved differently in transferring and non-transferring operations, respectively. Due to this feature and the described construction of the overdraft flap, 165 said flap in its different set positions, is rocked downwardly under non-transferring operation of said member 169 by coaction of the lugs 168 and 203 (Fig. 15) and under transferring operation of said member, or in other words when an overdraft occurs in the accumulator A, by coaction of the lugs 167 and 168 all for a purpose presently apparent. An upright overdraft conditioning lever 163 (Fig. 15) is pivotally mounted on the carriage C and operatively connected to said flap for rocking movement in opposite directions to set said flap into its different positions respectively. The overdraft conditioning lever 163 is rocked by a subjacent transverse overdraft conditioning bail 162 (Figs. 11, 15) suitably pivoted in the machine, on a shaft 83, about an horizontal axis. The lever 163 is bifurcated and straddling said bail for sliding movement along the same during travel of said carriage. The overdraft conditioning bail 162 is rocked by means of an upright lever 161 (Figs. 11, 15) pivoted intermediate its ends upon the before mentioned shaft 234 and operatively connected to said bail as at 226.

Parallel with said bail 162 and rocking vertically about the axis thereof is a clutch control flap 92 (Figs. 2, 15) terminating short of the left end of said bail for a purpose presently apparent. A pair of opposed levers 94 and 97 (Fig. 15) fast on said flap 92 and shaft 66, respectively, and a slot and pin connection 96, 95 between said levers operatively connect the flap 92 to said shaft 66 so that downward rocking of said flap 92 rocks the clutch control shaft 66 and clutch tripping dog 187 into a position to effect engagement of the carriage clutch 262 (Figs. 4, 9) against the tension of spring 186. Downward rocking of the clutch control flap 92 is effected by similar movement of the overdraft flap through the medium of a plungerlike overdraft slide 198 (Fig. 16) vertically slidable downwardly on the carriage C against the tension of a suitably connected spring 390. A guide slot 388 and a screw 387, as well as a slot 388a and shaft 389 provide for mounting said slide 198 on the carriage C. A lateral lug 386 (Figs. 15, 16) on the overdraft flap 165 overlying said slide 198 (Fig. 16) operatively connects the former with the latter and coacts with a fixed stud (Fig. 15) on the carriage C to limit upward movement of said flap and slide. In the normal position of the parts said overdraft slide 198 is spaced sufficiently above the clutch control flap 92 to permit free upward movement of said flap under rocking movement of the clutch control shaft 66 in a direction to effect engagement of the actuator clutch 182.

A flap 93 (Fig. 15) is swingably mounted at the left end of the clutch control flap 92 for movement in the same manner as the flap 92 by the overdraft slide 198 in the left hand limit of movement of the carriage C. A lateral lug 98 on the flap 93 overlying the clutch control flap 92 provides for downward movement of the latter by the former, under conditions to be described, and at the same time provides for independent downward movement of said flap 92. The flap 93 is tensioned against downward movement from normal position by means of a spring 102 (Fig. 15) connected to a key locking bail 103 to which said flap is operatively connected by the lever arm 99 and link 101 (Fig. 15). The key locking bail is subject matter of my co-pending application Ser. No. 147,588 filed of even date herewith and need merely be identified in passing.

It may be mentioned at this point that in the type of machine with which the present invention is particularly concerned the described overdraft mechanism is conditioned in divisional operations as an incident to automatic conditioning of the actuators R and revolution counter RC for addition and subtraction, and by automatic conditioning mechanism including an eccentric 400 (Fig. 10), connecting rod 401, shaft 402 (Fig. 10), cranks 403, 404 and coupling bar 405, all subject matter of my aforesaid co-pending application Serial No. 147,588. Under subtraction conditioning the lug 167 (Fig. 15) is vertically aligned with the lug 168. The automatic conditioning mechanism is idle in multiplication and therefor need not be further explained.

*Multiplier mechanism*

In the rear of the eight left hand value wheels 109 of the accumulator A and freely rotatable on the shafts 108 thereof are eight denominational value wheels 111 (Figs. 1 and 20) for setting up a multiplier each having delineated thereon the symbols 0 to 9 reversely arranged relative to those on said value wheels 109, and visible through appropriate sight openings S (Fig. 1) in the carriage cover plate 117. Rigidly connected to each multiplier wheel 111, by means of a sleeve 112, is a gear 113 meshing with a driving gear 119 fast on a shaft 91 suitably mounted in the carriage C. The usual knobs 118 (Fig. 20) fast on spindles 116, journaled in the carriage cover plate 117, provide for manually setting said wheels 111 through the medium of bevel gears 115 and 114, fast on said spindles and the gears 113 respectively.

Subjacent to the gears 119 is a multiplier lever 121 (Figs. 20 and 21) slotted at 123, for vertical and oscillating movement on a screw 122 on the main frame F to engage the gears 119, in different positions of the carriage C and intermittently operate the same in the proper direction to rotate said value wheels 111 step by step toward zero positions. The gears 119 are notched, respectively, at 120 so that in the zero positions of said value wheels 111 said lever operates idly with respect to said gears.

The multiplying lever 121 is operated by an eccentric rotatably mounted on the back of the machine on a screw 128 and indicated in dotted lines in Fig. 20 at 125, said eccentric rotating in an aperture 126 in said lever 121. A suitable train of gears 127, 129, 130 (Fig. 20) operatively connects the before mentioned tens carrying shaft 131 to the eccentric 125.

Fast on the rear ends of the shafts 91, at the rear of the carriage C (Figs. 15 and 20) are denominational zero cams 90, adapted, in the zero positions of the multiplier setting up wheels 111, to depress related subjacent denominational levers 211 pivoted at 257, at the back of the carriage C between the same and a fixed bar 87 (Fig. 3) for independent vertical movement. The function of said cams 90 and levers 211 will be presently described in detail. The levers 211 are arranged in overlapping relation to prevent their depression beyond normal position as shown in Fig. 15.

*The plus key and mechanism controlled thereby*

The key lever 23 of the plus multiplication key 19 is pivotally mounted on a short transverse shaft 24 (Figs. 12 and 13) for depression against the tension of a suitably connected spring 28 (Fig. 13). A guide plate 26 (Fig. 12) limits upward movement of said lever.

Depression of said key lever 23 is designed to swing the before mentioned key locking bail 176 (Figs. 11, 13, 22) forwardly into key locking position and to condition the overdraft flap 165, the actuators R and the revolutions counter RC. For this purpose said lever is provided with a right angled depending lever arm 30 (Figs. 13, 14) normally bearing at its lower end against a transverse bail operating yoke 31 pivoted on said shaft 24 (Figs. 12 and 13) to be rocked forwardly of the machine on depression of said lever 23 and disposed in front of the key locking bail 176. A rearwardly projecting arm 173 (Figs. 12, 13, 14, 22) on said yoke having a roller 173a thereon coacts with the previously mentioned arm 174 of said bail 176 to rock the latter in the proper direction under forward movement of said yoke 31. A tension spring 171 suitably connected to said yoke 31 and to a fixed stud (Figs. 12, 13, 14) urges said yoke 31 in the opposite direction into its normal position as established by engagement of said yoke 31 with the lower end of the key lever arm 30. As we have already seen swinging movement of the key locking bail 176 into key locking position swings the yoke 180 (Fig. 11) forwardly and the clutch control rocker 245 rocks clockwise and tensions the spring 186 whereby the clutch control shaft 66 and clutch tripping dog 187 are urged, toward actuator clutch engaging position. Such movement of said rocker 245 rocks the carrier 193 to effective position to effect energizing of the motor 1 in the manner previously explained.

Prior, however, to the operations described in the immediately preceding paragraph the overdraft flap 165 (Fig. 15) and actuators R (Fig. 22) are conditioned by operating connections between the plus key lever 23 and the overdraft conditioning bail 162 as follows.

Suitably journaled in the main frame F to extend transversely thereof, in the front part of the machine (Figs. 14 and 15), is a transverse multiplication controlling rock shaft 34 (Fig. 13) having fast thereon a crank member 145. The crank member 145 is operatively connected by a rearwardly extending link 146 (Figs. 11, 13, 14, 15) to the lower end of the previously identified upright lever 161 and also to the before mentioned stud 244 (Figs. 11, 14) on the actuator conditioning crank 147 so that upon rocking movement of said shaft 34 in opposite directions the locking bolt 149 will be operated to condition the actuators R for addition and subtraction, respectively, and the overdraft flap shifted to align the lugs 167 and 203 (Fig. 15) with the lug 168 of the related tens carrying member 169 under additive and subtractive conditioning of said actuators R respectively.

On depression of the plus multiplication key 19 said shaft 34 may be rocked in the proper direction, that is to say clockwise, as viewed in Figs. 13 and 14, to effect additive conditioning of the actuators R and alignment of the lug 167 with said lug 168 by means of a lateral lug 32 on the key lever 23 engaging the under side of a crank arm 33 fast on said shaft 34.

The above described conditioning of the actuators R and overdraft flap 165, it should be explained occur on depression of the plus multiplication key 19 in the event that said actuators R were previously conditioned for subtraction and said flap correspondingly conditioned as for instance under a prior subtracting operation. Otherwise operation of said plus key 19 is idle as regards operation of said shaft 34 as will presently more clearly appear.

Simultaneously with conditioning of the actuators R on depression of said key 19 the conditioning crank 152 is rocked, clockwise as viewed in Figs. 23 to 27, into the position illustrated in Fig. 23 from the position illustrated in Fig. 24 it being understood that under subtractive operations said crank is positioned as in Fig. 24. Under such swinging movement of said crank 152, the bar 153 is moved rearwardly to set the draw key 157 (Figs. 6, 7) in the proper direction to couple the forward driving or addition gear 159 to the sleeve 160 and thereby condition the revolutions counter RC for addition.

*Multiplication under control of plus key*

In multiplying under control of the plus key 19 let it be assumed that 25×25 is to be computed.

The multiplicand 25 is first set up in the key board in the two right hand rows of value keys K. The carriage C is shifted from its left hand position one step to the right under control of the carriage advancing key 14. The plus key 19 (Figs. 1, 2, 12, 14, 19) is now held depressed until the machine has executed two cycles of operation at which point the first digit 2 of the multiplier appears in the tens denomination of the revolutions counter RC and the value 50 in the hundreds and tens denominations of the accumulator A. The carriage C is next shifted one step to the left under control of the carriage retracting key 13 and the plus key held depressed until the machine has executed five cycles of operation whereupon the second digit 5 of the multiplier appears in the units denomination of the revolutions counter RC and the product 625 in the hundreds, tens and units denominations of the accumulator A.

It will be remembered that under depression of the plus key 19 lug 167 of the overdraft flap 165 (Fig. 15) is aligned with the lug 168 of the last tens carrying member 169. In this condition of the overdraft mechanism the tens carrying member 169 and overdraft slide coact in the event that a transfer occurs in the highest denomination of the accumulator A, or in other words in the event of an overdraft occurring in the accumulator A to depress the overdraft slide 198 against the clutch control flap 92 and thereby rock the latter downwardly as viewed in Fig. 15. As will be manifest an overdraft may occur by inadvertent sustained depression of the plus key 19 or with problems concerned with multipliers and multiplicands involving a greater number of digits than in the example given. Such rocking of the clutch control shaft 66, through the levers 94 and 97 (Fig. 15) rocks the clutch control shaft 66 to effect engagement of the carriage clutch 262 and disengagement of the actuator clutch 182. Since as already explained the carriage reverse mechanism is normally conditioned for retraction or left hand movement of the carriage C said carriage under such rocking of the clutch control shaft 66 steps one space to the left thereby advising the operator that an overdraft has occurred.

The rocking of the clutch control shaft 66 under the above indicated conditions is against the tension of the spring 186 (Fig. 11) as will be clear. Consequently as soon as the last tens carrying member 169 permits the overdraft slide 198 and flap 165 return to normal position under the urge of the spring 390 (Fig. 16) the clutch control shaft 66 is rocked back into actuator clutch engaging position by said spring 186.

It should be explained that the rocking of clutch control shaft 66 in multiplying under control of the plus key 19 and under overdraft conditions occurs only during travel of the carriage C substantially in the length of the clutch control flap 92. In the extreme left hand position of said carriage C, under overdraft conditions, the before identified disabling flap 93 is rocked by the overdraft slide 198.

*The minus key and mechanism controlled thereby*

The key lever 35 of the minus key 18 is also mounted on the transverse shaft 24 (Figs. 12, 13) for depression. A suitably connected spring 38 tensions said lever against depression from normal position determined by contact of said lever with the guide plate 26. A depending lever arm 41 (Figs. 13, 14) on said lever 35 normally bears against the bail operating yoke 31 so that upon depression of the minus key 18 said yoke 31 is rocked to effect the same results as described with reference to the plus key 19. A lateral lug 37 on said key lever 35 overlies the crank arm 33 (Fig. 14) on the multiplication controlling shaft 34 so that upon depression of the minus key 18 said shaft may be rocked in the opposite direction to that in which it is rocked by the plus key 19. Such rocking movement of said shaft 34 changes the conditioning of the actuators R and revolutions counter RC from additive to subtraction as will be understood from the foregoing description, of the conditioning of these parts by the plus key 19. Coincidentally the overdraft flap 165 (Fig. 15) is shifted on the shaft 166, reversely as regards its direction of movement under depression of the plus key 19, so that the lug 203 is aligned vertically with the lug 168 of the tens carrying member 169 of highest denomination as shown for instance in Fig. 15.

*Operation under control of minus key*

In explaining operations under control of the minus key 18 let it be assumed that it is desired to subtract 3×18 from the previously accumulated product 625 and that the key board has been cleared. First the multiplicand 18 is set up by the appropriate value keys K in the two right hand rows the carriage C remaining in the position it occupied at the finish of the prior accumulating operation.

The minus key 18 is next held depressed until the digit 2 appears in the units denomination of the revolutions counter RC during which operation the units value wheel 110 as will be understood rotates negatively 3 steps from its previous 5 registering position. In the accumulator A the value 571 appears 3×18 having been subtracted from 625 by complemental addition.

As will be understood in the operation of subtracting by complemental addition transfer operations occur in the accumulator A. As long as said accumulator does not overstep zero position. Each time the tens carrying member 169 (Fig. 15) of highest denomination executes transferring movement its lug 168 wipes past the lug 203 of said flap whereby such movement of said member is idle as regards overdraft flap 165. If however said accumulator A oversteps zero position the lug 168 of said member 169 coacts with the lug 203 of the flap 165 to swing the latter and operate the overdraft slide 198 and clutch control flap 92 in the same manner and with the same results as described with reference to operation under control of the plus key 19 so that the operator is similarly advised as to the condition of the machine.

*Automatic minus multiplication key and mechanism controlled thereby*

The key lever 223 of the automatic minus multiplication key 22 (Figs. 12, 13 and 14) is also mounted on the before mentioned shaft 24 for depression against the tension of a suitable spring 222. A slot 285 (Fig. 14) in said lever through which said shaft extends provides for sliding movement of the lever to engage a detent notch 286 thereon with a suitable part of the before mentioned guide plate 26 (Fig. 12) whereby the key 22 may be latched depressed. Upward movement of said lever 223 is limited by said guide plate 26. A bifurcated depending lever arm 287 on said key lever 223 engages one arm of a bell crank lever 219 (Fig. 14) mounted to rock on the multiplication controlling shaft 34. The other arm of the bell crank lever 219 is bifurcated to receive a stud 217 on a link 289 (Fig. 14) pivoted upon a rocker 59 presently referred to in detail. The bifurcated arm of the bell crank lever 219 is designed to function as a guide for said stud under conditions hereinafter set forth in detail. The stud 217 extends into a cam slot 291 in a horizontally extending crank 221 fast on the multiplication controlling shaft 34 whereby as will presently be described in detail said crank and shaft are rocked by said stud. The cam slot 291 is restricted at its outer end for coupling said shafts to the stud 217.

*The automatic multiplication lever and mechanism under control thereof*

The automatic multiplication key lever 21 (Fig. 13) is pivoted intermediate its ends as indicated at 45 in the machine frame F for setting forwardly and rearwardly of the machine from a normal intermediate position. A latch bar 50 slidably mounted by slots 49 therein upon fixed studs 52, 53, and tensioned by a spring 55 coacts with notches 21a in the lever 21 in the different set positions of the latter to yieldingly retain said lever in set position. The key lever 21 is operatively connected to a rocker 59 pendent from the before mentioned shaft 24 so that setting of said lever forwardly or rearwardly swings said rocker forwardly. The operating connections between said lever 21 and rocker takes the form of a hook 275 on one side of the pivot point of said lever underlying a lateral lug 276 on said rocker 59 and a lateral lug 58 on said rocker on the opposite side of the pivot thereof overlying the front edge 57 of said lever 21.

Swingably mounted on the clutch control shaft 66 is a bail 67 (Fig. 15) rockable vertically in opposite directions from a normal intermediate position. Vertically swingable on the before mentioned axis members 83, is a flap 84 extending beneath the before mentioned denominational levers 211.

The flap 84 (Fig. 15) is swung into and from effective position relative to said levers 211 as an incident to rocking of said bail in opposite directions, respectively, said bail and flap having opposed lever arms 79, and 82 thereon, respectively, operatively connected at 81, and 80, so that rocking of said bail 67 upwardly similarly rocks said flap to effective position and downward rocking of said bail permits gravitational downward movement of said flap from effective position. In its effective position the flap 84 is designed to be wipingly engaged successively by said levers 211 during denominational spacing of the carriage C. Cooperating stops 71 and 72 (Fig. 15) on said bail 67 and the frame F respectively, limit movement of said bail 67 in one direction. A suitably connected tension spring 73 urges said bail 67 upwardly.

The rocker 59 (Figs. 13 and 14) is adapted to operate the previously described bail operating yoke 31 by means of a lug 60 engaging the rear edge of said yoke whereby when said rocker is swung forwardly the yoke is similarly swung as will be apparent from an inspection of Fig. 13. The rocker 59 is operatively connected to the bail 67 (Fig. 15) and to the clutch control shaft 66 as follows. Pivoted at its front end to the lower end of said rocker 59 is a rearwardly extending coupling bar 61 (Fig. 13) having a rear upstanding arm 62 (Figs. 15 and 17) disposed intermediate one end of said bail 67 and a crank 76 fast on said shaft 66. A cross pin 63 on said arm 62 projects at one end into an inclined cam slot 64 in said end of the bail 67 and at its other end into a cam slot 75 in said crank 76. The cam slot 75 has a restricted outer end into which said cross pin 63 is designed to be moved to couple the clutch control shaft 66 and the bail 67 together under certain conditions referred to in detail as this description proceeds. The bar 61 is provided at its rear end with a lug 77 forming an inclined cam 212 designed to cooperate with a fixed lug 78 (Figs. 3 and 15) on the main frame F in a manner to be described.

The lower end of the automatic multiplication lever 21 (Fig. 13) is operatively connected by a link 229 to a bell crank lever 232 (Fig. 15) pivoted on the before mentioned shaft 234 for vertical rocking movement and having one arm thereof extending into the recesses 235 (Fig. 19) and 237a of the previously identified levers 236 and 237, respectively. The bell crank lever 232 operates said levers 236, 237 and locks the same under conditions presently appearing.

*Automatic multiplication in right hand movement of the carriage*

The automatic multiplication lever 21 is designed in its rearward and forward settings to condition the machine for automatic multiplication in right and left hand movement of the carriage C respectively.

Considering first multiplication in right hand movement of said carriage C is being understood that this operation is initiated with the carriage C in its left hand position in which the units denominational lever 211 is located over the flap 84 (Fig. 15).

Again taking the problem 25×25 by way of example, first the multiplicand 25 is set up in the two right rows of value keys K. The multiplier is then set up in the tens and units multiplier setting up wheels 111 (Fig. 20) by manipulation of the appropriate knobs 118. The setting up of the multiplier, as will be clear, rotates the high points of the zero cams 90, related to said tens and units wheels 111, 2 and 5 steps of movement from the related denominational levers 211 (Fig. 15) respectively. It will be remembered that the spring 73 urges the bail 67 upwardly toward normal position as determined by coaction of the step lugs 212 and 78 on the bar 61 and frame F respectively. Under the described setting of the units zero cam 209, the related lever 211 is free to move upwardly and permit the bail 67 to assume normal position thereby rocking the flap 84 upwardly the latter moving the units lever 211 upwardly into the path of movement of the high point of the zero cam 90 of units denomination as shown in Fig. 15.

The automatic multiplication lever 21 is next set rearwardly, clockwise as viewed in Fig. 13, thereby picking up the rocker 59 by way of lug 58 and moving said rocker forwardly whereupon the following operations occur.

If the actuators R, revolutions counter RC and overdraft flap 165 (Fig. 15) are conditioned for subtraction as for instance at the end of operation under control of the minus key 18 such conditioning is reversed. This is accomplished by movement of the link 289 (Fig. 14) forwardly with the rocker 59 and coaction of the stud 217 on said link with the bifurcated arm of the bell crank 219, and the upper edge of the cam slot 291 in the crank 221. In this connection it should be explained that during such movement of the link 289 the bell crank 219 is held stationary by the tension of the spring 222 (Fig. 14) on the key lever 223 so that the bifurcated arm of said bell crank 219 functions as a guide slot for said stud 217 whereby the latter in its forward movement cams said crank 221 upwardly to rock the multiplication controlling shaft 34 in the proper direction to reverse a prior subtractive conditioning of the machine. In this reverse conditioning as will now be clear the locking bolt 149 is projected through the proper actuator R of the series as shown in Fig. 14 the gear 202 (Figs. 6 and 7a) of the counter reverse gearing is coupled to the sleeve 160 and the overdraft flap 165 (Fig. 15) is shifted along the shaft 166 so that the lug 167 is aligned with the lug 168 of the last tens carrying member 169. If the mechanism is conditioned for addition movement of the stud 217 (Fig. 14) is idle with respect to the crank 221 as will be understood.

It will be remembered that the carriage reverse gearing is normally conditioned for left hand movement, or retraction, of the carriage C by means of the rocking bell crank 241 (Fig. 18) and spring 278 urging the levers 236, 237, 238, comprising the carriage reverse gear conditioning unit; before described, in the proper direction that is to say counterclockwise as viewed in Fig. 18. Also that in the left hand position of said carriage C such conditioning of the carriage reverse gearing is reversed by coaction of the tappet 264 and said bell crank 241.

In the described setting of the automatic multiplication lever 21 (Fig. 13) the gear conditioning unit that is to say levers 236, 237, 238 (Fig. 18) are locked by means of the bell crank 232 which is rocked in the recesses 235, 237a of levers 236, 237, by the link connection 229 between the same and the rocker 59 and in the proper direction, that is to say clockwise, to block return of said levers 236, 237 to normal position. In the event that the reverse conditioning of the carriage reverse gearing has not occurred as for instance if the carriage is partially retracted to the left said levers 236, 237, 238 are rocked in the proper direction by said bell crank 232 to effect such reverse conditioning of said gearing and locked against return. As will be evident the described locking occurs by virtue of the fact that said lever 21 is locked in set position by the latch bar 50 (Fig. 13).

Under the described setting of the automatic multiplication lever 21 and consequent forward movement of the rocker 59 the yoke 31 is moved forwardly by the lug 60 on said rocker. As we have already seen such movement of the yoke 31 swings the key locking bail 176 and the latter through the connecting yoke 180 (Fig. 11) and link 183 swings the clutch control rocker 245 to tension the spring 186 and thereby urge the clutch tripping dog 187 toward actuator clutch engaging position. In the present instance however movement of the clutch tripping dog 187 to actuator clutch engaging position under the urge of the spring 186 is delayed by the following means. In the described forward operation of the rocker 59 (Fig. 13) the bar 61 pivoted thereto is similarly moved by said rocker 59 and its rear cam end 212 (Fig. 17) cammed downwardly by coaction of the camming stop 212 thereon with the fixed stop 78. In this movement of said bar 61 the cross pin 63 thereon coacts on the one hand with the inclined slot 64 of the bail 67 to move the latter downward slightly and on the other hand with the lower edge 76a of the cam slot 75 in the crank 76. The coaction of the cross pin 63 with the cam slot 75 is sufficient to rock the clutch control shaft 66 in the proper direction to swing the clutch tripping dog 187 back into its intermediate position before it reaches actuator clutch engaging position. Since downward movement of the bail 67 (Fig. 15) is against the tension of the spring 73 downward movement of said bar 61 is similarly opposed, so that as soon as the camming stop 212 wipes past the fixed stop 78 said bar is moved upwardly by return of the bail 67 under the tension exerted against said bail. Upward movement of said bar 61 is sufficient to permit the clutch tripping dog 187 (Fig. 11) to be rocked by the spring 186 into actuator clutch engaging position it being understood that in the meantime the key locking bail 176 and consequently the clutch control rocker 245 have been held by the yoke 31 (Fig. 13) and rocker 59 in the described position for tensioning said spring 186 (Fig. 11). At the completion of the upward and forward movement of the bar 61 the cross pin 63 (Fig. 17) is engaged with the restricted part of the slot 75 of the crank 76 so that the clutch control shaft 66 and the bail 67 are coupled together against independent movement as long as the lever 21 remains in its described setting for a purpose presently seen. As previously explained coincidentally with movement of the clutch tripping dog 187 (Fig. 11) to actuator clutch engaging position the motor contacts 195, 196 are closed and the motor 1 rendered effective.

In the swinging of the clutch control shaft 66 and clutch tripping dog 187 to actuator clutch engaging position under the tension of the spring 186 the bail 67 (Figs. 15 and 17) is raised into a position to move the flap 84 upwardly and raise the units denominational lever 211 until the latter just clears the low point of the units zero cam 90.

The machine now executes five cycles of operation during which the eccentric 125 (Fig. 20) operates the multiplier lever 121, in a manner which will be clear, to rotate the multiplier setting up wheel 119 of units denomination back to zero registering position. At this point the notch 120 of said wheel 119 is aligned with the multiplier lever 121 and the latter is ineffective against said wheel. The multiplicand 25 is accumulated in the accumulator A five times. In the zero registering position of said units multiplier wheel 119 the high point of its related zero cam 90 depresses the units denominational lever 211 against the flap 84 (Fig. 15) and said flap is rocked downwardly. Downward movement of the flap 84 rocks the bail 67 downwardly, that is to say counter clockwise in Fig. 15, against the tension of the spring 73. Said bail 67 through the described coupling of the same to the crank 76 rocks the clutch control shaft 66 and clutch tripping dog 187 to effect disengagement of the actuator clutch 182 and engagement of the carriage clutch 262 so that the carriage C is driven one step to the right. Coincidentally with the step of movement of said carriage the flap 84 moves under the tens denominational lever 211 which due to the position of the high point of the tens zero cam 90 is free to move upwardly and thereby permit upward movement of the flap 84. At this point the clutch control shaft 66 and clutch tripping dog 187 are rocked under the reaction of the spring 186 (Fig. 11) to effect reengagement of the actuator clutch 182 and disengagement of the carriage clutch 262. As will be clear such rocking of said shaft 66 through the described coupling between the crank 76 (Fig. 15) and bail 67 effects, together with the tension of the spring 73, upward movement of said bail 67 whereupon the flap 84 is moved upwardly to elevate the tens lever 211 adjacent to the low point of the tens zero cam 90.

In the new location of the carriage C above described the machine executes two cycles of operation whereby the multiplier setting up wheel of tens denomination is rotated to zero registering position, the high point of the related zero cam 90 rotated against the flap 84 and the latter rocked downwardly by said cam to again effect disengagement of the actuator clutch 182 and engagement of the carriage clutch 262 in the manner before described. As will be understood the multiplicand 25 has been accumulated in the accumulator A twice in the next higher denominations said accumulator thereby displaying the product. The multiplier wheels 111 register zero and the revolutions counter RC the multiplier 25.

Since the multiplier wheels 119 (Fig. 20) above the tens denomination are on zero position likewise the related zero cams 90 the flap 84 is held down by said cams the carriage clutch 262 is maintained closed and the carriage C is spaced into its extreme right hand position. At this point the tappet 263 (Fig. 18) coact with the before mentioned bell crank 241 to effect movement of the levers 236, 237, 238 of the before described conditioning unit in the proper direction, that is to say counter clockwise, to condition the carriage reverse gearing for left hand driving or retraction of said carriage C in the manner previously described in detail. In this movement of said levers 236, 237, 238 the lever 236 acts upon the bell crank 232 to rock the same counter clockwise, as viewed in Fig. 15, whereby through the link 229 the automatic multiplication lever 21 is returned to intermediate position. The latch bar 50 manifestly permits such return of said lever.

During return of the said lever 21 the yoke 31 is returned rearwardly by the spring 171 (Fig. 13) and the rocker 59 returned by said yoke. Return of said rocker 59 moves the rod 61 rearwardly and the cross pin 63 (Fig. 15) into the larger end of the slot 75 in the crank 76 thereby uncoupling the clutch control shaft 66 from the bail 67. During such rearward movement of the bar 61 the rear end thereof is cammed downwardly by coaction of the cross pin 63 with the inclined slot 64 of the bail 67 the latter being held stationary by cooperation of the zero cam 90 of highest denomination with the corresponding lever 211 and by coaction of said lever with the flap 84. The downward and rearward movement of said bar 61 again locates the camming stop 272 relative to the fixed stop 78 and permits the crank 76, clutch control shaft 66 and clutch tripping dog 187 to be rocked in the proper direction by the spring 186 (Fig. 11) to effect disengagement of the carriage clutch 262. Since in the return of the yoke 31 the key locking bail 176 (Fig. 22) is released thereby for return to normal position under the urge of the spring 180a (Fig. 11) the clutch control rocker 245 has been returned to normal position and the tension on the spring 186 relaxed whereby as will be understood the clutch tripping dog 187 is rocked into its intermediate position only in which both clutches 262, 182 are disengaged and the machine brought to rest.

If desired the multiplication lever 21 may be manually returned to intermediate position and the machine thus stopped. Under this procedure said lever is preferably returned to said position when the carriage C is located in its last or highest multiplying position. When said lever 21 is thus returned the bar 229 (Figs. 13, 15) is moved rearwardly with the results previously described with reference thereto. Rearward movement of the rocker 59 and bar 61 is however blocked by abutting of its rear end and the fixed stop 78 (Fig. 15). As a consequence the actuator clutch remains engaged for reasons which will be obvious, until the multiplier setting up wheel of tens denomination reaches zero registering position likewise the related zero cam 90. In this position said zero cam 90 rocks the flap 84 (Fig. 15) downwardly, the latter similarly rocking the bail 67. The rod 61 is thus lowered until it can move 212 beneath the fixed stop 78. This positioning of said rod 61 occurs simultaneously with movement of the clutch tripping dog 187 by the spring 186 to intermediate position. At this point the machine is stopped in a manner which will be clear from the foregoing description.

Automatic multiplication in left hand movement of the carriage

Multiplication in left hand movement of the carriage C will be explained in computing the same example 25×25. First, the multiplier and multiplicand are set up in the same manner as described with reference to automatic multiplication in right hand movement of the carriage C, said carriage being shifted into its appropriate right hand position. In this position of said carriage C the zero cam 90 of highest denomination being in zero position coacts with the relative denominational lever 211 (Fig. 15) to rock the flap 84 downward, as will be clear, so that the bail 67 is rocked downward. As will be understood in this downward movement of said bail 67 the steps 71, 72 coact to limit such movement of said bail. In its downward movement said bail 67 by means of the slot 64 and cross pin 63 moves the rear end of the bar 61 downwardly but idly with respect to the crank 76 said cross pin playing on the wide part of said slot.

The automatic multiplication lever 21 (Fig. 13) is now set forwardly of its intermediate position whereby the bell crank 232 (Fig. 18) through the link 229 is rocked, counter-clockwise as viewed in Fig. 15. It will be remembered that in the right hand position of the carriage C the levers 236, 237, 238 of the carriage reverse gear conditioning unit are rocked in the proper direction, that is to say counter-clockwise, to condition the carriage reverse gearing for left hand drive of the carriage C to and through coaction of the tappet 263, and bell crank 241. Also that under the action of the spring 278 (Fig. 18) said levers are normally urged in this direction. The described swinging of the bell crank 232 positions the same to lock said levers 236, 237, 238 in the position in which they have been swung under the described control of the carriage C and spring 278 and thereby lock the carriage-reverse gearing in carriage retracting or left-hand driving condition in which condition of said gearing as will be clear the gear 240 (Fig. 10) is coupled to the sleeve 262d.

In the above described setting of the automatic multiplication lever 21 (Fig. 13) the rocker 59 is again swung forwardly, as viewed in Fig. 13, whereby through the bar 61 the cross pin 63 (Fig. 15) is moved forwardly in the slot 75 of the crank 76 the inclined slot 64 in the bail 67 acting as a fixed guide for said pin. In such movement of said bar 61 said pin 63 coacts with the lower edge 76a of the crank 76 to rock the clutch control shaft 66 and clutch tripping dog 187 and thereby effect engagement of the carriage clutch 262 and closing of the motor contacts 195, 196 in a manner which will be clear from the foregoing description of such operations. Also in such movement of the bar 61 and pin 63 the clutch control shaft 66 is coupled to the depressed bail 67 (Fig. 15) by entrance of the pin 63 into the restricted part of said slot.

In the forward swinging of the rocker 59 (Fig. 14) the stud 217 coacts with the cam slot 291 of the crank 221 in the same way as described with reference to multiplication in right hand movement of the carriage C to thereby rock the multiplication controlling shaft 34 and condition the machine for addition in the event that said machine has been previously conditioned for subtraction.

The carriage C is now driven to the left until the denominational lever 211 associated with the zero cam of tens denomination overlies the flap 84 (Fig. 15). This operation follows as will be clear by virtue of the fact that the levers 211 to the left of said associated lever are held depressed by their zero cams 90 which are in zero position and said levers to the left successively operate on the flap 84 to hold the same rocked downwardly.

It will be remembered at this point that in the swinging of the clutch control shaft 66 and clutch tripping dog 187 (Fig. 11) to effect engagement of the carriage clutch 262 the spring 186 was tensioned and in the downward movement of the bail 67 (Fig. 15) the spring 73 also was tensioned. Therefore, as soon as the denominational lever 211 associated with the tens zero cam 90 reaches overlying position relative to the flap 84 the bail 67 is moved upwardly under the combined tension of said springs 186 (Fig. 11) and 171 (Fig. 13) since, as previously explained in substance, when any multiplier setting up wheel 111 (Fig. 20) is out of zero registering position its related zero cam 90 (Fig. 15) permits upward movement of the corresponding denominational lever 211 and hence the flap 84. As we have previously seen upward movement of the bail 67 effects rocking of the clutch control shaft 66 and clutch tripping dog 187 to disengage the carriage clutch 262 and engage the actuator clutch 182. From this point on until the carriage C reaches its extreme left hand position multiplication proceeds in the same manner as described in detail with reference to automatic multiplication in right hand movement of said carriage C.

Upon the arrival of the carriage C into its extreme left hand position the carriage reverse gearing is conditioned for right hand travel of the carriage C by coaction of the tappet 264 (Fig. 18) and bell crank 241 whereby the levers 236, 237, and 238 of the described conditioning unit are rocked in the proper direction, that is to say, clockwise as viewed in Fig. 18, to couple the gear 239 to the sleeve 262d. In such rocking of said levers 236, 237, 238, the bell crank 232 is rocked downwardly, that is to say, clockwise as viewed in Fig. 15, whereby, through the link 229 the automatic multiplication lever 21 (Fig. 13) is returned to intermediate position. As said lever 21 is returned the lug 275 thereof releases the lug 276 of the rocker 59. After multiplication has been completed, that is to say, when the units multiplier setting up wheel has been returned to zero registering position the rocker 59 together with related parts are returned and the machine is stopped in the manner previously described.

The automatic multiplication lever 21 may, as will be manifest, be returned by hand just as in case of automatic multiplication in right hand movement of the carriage C.

Operation under control of automatic minus multiplication key and multiplication lever The automatic minus multiplication key 22 (Fig. 13) is for use principally conjointly with the automatic multiplication lever 21 in multiplying two sets of factors and subtracting the product of one set from that of the others for instance, 25×25—15×25. The previously solved problem 25×25 has been taken merely to shorten the description of operations. At the end of the performance of this part of the problem it will be remembered the multiplier setting up wheels 111 are in zero registering position, or cleared, and the revolutions counter RC registers 25 in the units and tens denominations. The multiplicand 25 is still set up in the machine as previously described it being understood that the keyboard has not been cleared. The accumulator A registers 625 in the three lowest denominations. The carriage C is in right hand position and the carriage reverse gearing conditioned for left hand driving operation.

First the multiplier 15 is set up in the multiplier wheels 111 (Fig. 20) of units and tens denomination by way of the appropriate knobs 118. The automatic minus multiplication key 22 (Figs. 13 and 14) is next depressed and the key lever 223 thereof slides on the shaft 24 by means of the slot 285 into interlocking engagement with the guide plate 26 to lock said key down. In this swinging movement of the key lever 223 the lever arm 287 thereof swings the bifurcated rocker 219 on the multiplication controlling shaft 34, counterclockwise as viewed in Fig. 14, whereby the link 289 is set downwardly, that is to say clockwise, on the rocker 59 and in the slot 291 of the crank 221. Since the machine was previously conditioned for addition the rocker 221 was swung upwardly. However, the downward setting of the link 289 and stud 217 is idle against said crank, in the present instance, and the conditioning of the machine so far remains unchanged.

The automatic multiplication lever 21 is next set forwardly, that is to say counterclockwise whereby through coaction of the lugs 275, 276 (Fig. 13) the rocker is swung forwardly, or clockwise. As will be clear in the described setting of the link 219 the stud 217 is cammed downwardly by the bifurcated end of said link during forward movement of the rocker 59 whereby said stud coacts with the lower edge of the slot 291 in the crank 221 to rock the same together with the multiplication controlling shaft 34 in the proper direction to condition the machine for subtraction in the same manner as previously described. In this conditioning the conditioning crank 152, bar 153 and related parts of these two elements assume the position illustrated in Fig. 24.

The machine now operates in the same manner as described with reference to automatic multiplication in left hand movement of the carriage C with the exception that the product of 15×25 is subtracted from the previously accumulated product 625 so that the accumulator A registers 250. Also the multiplier 15 is subtracted from the multiplier 25 previously accumulated in the revolutions counter RC so that said counter registers 10.

Correction operation

On depression of the plus multiplication key 19, as before specified the conditioning crank 152 and bar assume the position illustrated in Fig. 23. If now, for example, it is desired to eliminate operation of the revolutions counter RC, the correction key 20 (Fig. 13), the key lever 133 of which is pivoted on the before mentioned shaft 24, is partially depressed against the tension of a spring 135 suitably connected to said lever. In the partially depressed position of said lever 133 a notch 142 therein coacts with the guide plate 26 (Fig. 12) to lock said key down. The key lever 133 overlies an extension arm 139 (Fig. 13) of a rocker 140 also pivoted in said shaft 24 whereby on said depression of the correction key 20 the rocker is operated clockwise as viewed in Fig. 13. The rocker 140 is operatively connected by a link 298 with a crank arm 299 fast on the shaft 175 (Fig. 22) to rock the latter and consequently the crank 300 fast thereon clockwise as viewed in Figs. 22 and 23 to 27. Through the pin and slot connection 301, 302 of said crank 300 to the before mentioned bar 153 the latter is lowered into the position shown in Fig. 24 relative to the conditioning crank 152. In this lowering movement of said bar 153 one edge of the before mentioned slot 309 therein coacts with the extending end of the shaft 148 to cam said bar forwardly into the position shown in Fig. 27 and thereby set the draw key 157 (Fig. 6) associated with the counter reverse gearing in intermediate position whereby the revolution counter RC is disabled as will be clear.

If on the other hand, the said conditioning crank 152 and bar 153 have been moved into subtractive position illustrated in Fig. 24 as for instance by depression of the minus multiplication key 18 under such partial depression of the correction key 20 the opposite side of the slot 309 coacts with said extending end of the shaft 148 to cam said bar 153 in the opposite direction into the Fig. 23 position and thereby set said draw key 157 in intermediate position and again disable the revolutions counter RC.

If the correction key 20 is completely depressed, following upon depression of the plus multiplication key 19, in which position said key 20 is locked down by coaction of the notch 141 (Fig. 13) in its key lever 133 with said plate 26 (Fig. 12) said bar 153 is lowered from the position illustrated in Fig. 23 so that its lower stud 294 coacts with one side edge of the lower recess 310a whereby said bar 153 is cammed forwardly into the position illustrated in Fig. 25 whereby as will be clear the draw key 157 (Figs. 6, 7) is set to effect subtractive conditioning of the revolution counter RC.

With the minus multiplication key 18 depressed under which condition said crank 152 and bar 153 are positioned as in Fig. 24, complete depression of the correction key 20 lowers said bar 153 so that said lower stud 294 coacts with the opposite side edge of said lower recess 310a whereby said bar 153 is cammed rearwardly said bar and the crank 152 assuming the position shown in Fig. 26. In this position of the parts the revolutions counter RC is conditioned for addition.

In automatic multiplication under partial depression of the correction key 20 the conditioning crank 152 and bar 153 assume the position shown in Fig. 27 in which the revolutions counter RC is disabled and under complete depression of said key 20 the position shown in Fig. 25 in which position said counter is conditioned for subtraction.

The foregoing constitutes a detailed description of a preferred embodiment of my invention and it is thought that the details and operation will be clear therefrom. It is to be understood however that the present disclosure is illustrative rather than restrictive and that right is herein reserved to modifications of details disclosed falling within the scope of the claims appended hereto.

What I claim is:

1. In a calculating machine having an accumulator for registering a product, differential mechanism in which a multiplicand may be set, actuating means for said accumulator controlled by said mechanism, a shiftable carriage carrying said accumulator, a multiplier setting up mechanism including cams for setting up a multiplier, driving means for said carriage to advance the latter to the right and retract it to the left, respectively, including a device for determining the direction in which the drive shifts the carriage, a second driving means for said actuating means, and a third driving means for said multiplier setting up cams to drive said cams back to zero, in combination, a multiplication control lever settable in opposite directions, a motor drive operating all of said driving means and rendered operative upon movement of said mltiplication control lever in either direction to cause the actuating means to automatically register the product in the accumulator under the control of the multiplier setting up mechanism, and means controlled by said lever upon movement thereof in opposite directions for setting said device to determine shifting of the carriage in one direction or alternatively in the other direction, respectively, during the multiplying operation.

2. In a calculating machine having a carriage, means for setting up a multiplicand, a multiplier setting up mechanism including cams for setting up a multiplier, a motor drive, driving means for said multiplier setting up cams to drive the latter back to zero for controlling the multiplication operations, a second driving means for said carriage to advance the carriage to the right and retract the latter to the left respectively, all of said driving means being driven by said motor drive, said driving means including a pair of clutches related to said carriage and to multiplier setting up cams, respectively, a clutch control rock shaft movable in opposite directions to effect selective engagement of said clutches with said motor drive; a multiplication control lever, and means to effect movement of said shaft in opposite directions under conjoint control of said lever and said multiplier setting up cams.

3. In a calculating machine having a carriage, means for setting up a multiplicand, a multiplier setting up mechanism including cams for setting up a multiplier, a motor drive, driving means for said multiplier setting up cams to drive the latter back to zero for controlling the multiplication operations, second driving means for operating said carriage, said driving means including a pair of clutches related to said multiplier setting up cams and to said carriage, respectively, a clutch control rock shaft movable in opposite directions to effect selective engagement of said clutches with said motor drive; a multiplication control lever, and means to rock said clutch control rock shaft including a rocking bail thereon operative under the conjoint control of said lever and said multiplier setting up cams.

4. In a calculating machine having an accumulator for registering a product, differential mechanism in which a multiplicand may be set, actuating means for said accumulator controlled by said mechanism, a shiftable carriage carrying said accumulator, a multiplier setting up mechanism including cams for setting up a multiplier, driving means for said carriage to advance the latter to the right and retract it to the left, respectively, including a device for determining the direction in which the drive shifts the carriage, a second driving means for said actuating means, and a third driving means for said multiplier setting up cams to drive said cams back to zero, in combination, a multiplication control lever settable in opposite directions from an intermediate position, a motor drive operating all of said driving means and rendered operative upon movement of said multiplication control lever in either direction to cause the actuating means to automatically register the product in the accumulator under the control of the multiplier setting up mechanism, means controlled by said lever upon movement thereof in opposite directions for setting said device to determine shifting of the carriage in one direction or alternatively in the other direction, respectively, during the multiplying operation, and carriage controlled means for returning the lever to intermediate position when the carriage occupies its right or left end position.

AUGUST FRIEDRICH POTT.